United States Patent
Liu et al.

(10) Patent No.: US 11,551,219 B2
(45) Date of Patent: Jan. 10, 2023

(54) PAYMENT METHOD, CLIENT, ELECTRONIC DEVICE, STORAGE MEDIUM, AND SERVER

(71) Applicant: ALIBABA GROUP HOLDING LIMITED, Grand Cayman (KY)

(72) Inventors: Gang Liu, Seattle, WA (US); Qingen Zhao, Hangzhou (CN); Guangxing Liu, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 106 days.

(21) Appl. No.: 16/008,765

(22) Filed: Jun. 14, 2018

(65) Prior Publication Data

US 2018/0365695 A1 Dec. 20, 2018

(30) Foreign Application Priority Data

Jun. 16, 2017 (CN) .......................... 201710457967.6

(51) Int. Cl.
*G06Q 20/40* (2012.01)
*G06Q 20/10* (2012.01)
(Continued)

(52) U.S. Cl.
CPC ....... *G06Q 20/4014* (2013.01); *G06K 9/6215* (2013.01); *G06K 9/6232* (2013.01);
(Continued)

(58) Field of Classification Search
None
See application file for complete search history.

(56) References Cited

U.S. PATENT DOCUMENTS 5,517,558 A * 5/1996 Schalk .................... G06F 21/40
379/88.02
6,393,305 B1 5/2002 Ulvinen et al.
(Continued)

FOREIGN PATENT DOCUMENTS

CN 103258270 A 8/2013
CN 104392353 A 3/2015
(Continued)

OTHER PUBLICATIONS

Mohammad Hadiana et al. "Privacy-preserving voice-based search over mHealth data". Smart Health. vol. 12. pp. 24-34. Available online Apr. 27, 2018. https://doi.org/10.1016/j.smhl.2018.04.001 (Year: 2018).*
(Continued)

*Primary Examiner* — Ayal I. Sharon

(57) ABSTRACT

Embodiments of this application disclose a payment method, a client, an electronic device, a storage medium, and a server. The method includes: receiving a payment instruction of a user; generating, according to audio information in a voice input of the user, a voice feature vector of the audio information; performing matching between the voice feature vector and a user feature vector; and when the matching succeeds, sending personal information associated with the user feature vector to a server, so that the server performs a payment operation for a resource account associated with the personal information. The method can bring convenience to shopping by a consumer.

19 Claims, 25 Drawing Sheets

(51) Int. Cl.

| | |
|---|---|
| *G06Q 20/42* | (2012.01) |
| *G06K 9/62* | (2022.01) |
| *G10L 17/24* | (2013.01) |
| *G10L 15/22* | (2006.01) |
| *G10L 17/22* | (2013.01) |
| *G10L 17/00* | (2013.01) |
| *G06V 40/10* | (2022.01) |
| *G10L 15/08* | (2006.01) |
| *G10L 17/02* | (2013.01) |

(52) U.S. Cl.
CPC ..... *G06Q 20/102* (2013.01); *G06Q 20/40145* (2013.01); *G06Q 20/42* (2013.01); *G06V 40/10* (2022.01); *G10L 15/22* (2013.01); *G10L 17/00* (2013.01); *G10L 17/22* (2013.01); *G10L 17/24* (2013.01); *G10L 17/02* (2013.01); *G10L 2015/088* (2013.01); *G10L 2015/223* (2013.01)

(56) References Cited

U.S. PATENT DOCUMENTS

| | | | |
|---|---|---|---|
| 7,173,910 B2 | 2/2007 | Goodman | |
| 8,024,193 B2 * | 9/2011 | Bellegarda | G10L 13/06 |
| | | | 704/258 |
| 8,155,964 B2 * | 4/2012 | Hirose | G10L 13/033 |
| | | | 704/260 |
| 8,499,342 B1 * | 7/2013 | Macwan | H04L 63/0861 |
| | | | 726/7 |
| 8,694,537 B2 * | 4/2014 | Mohajer | G10L 15/063 |
| | | | 707/769 |
| 9,159,319 B1 * | 10/2015 | Hoffmeister | G10L 15/08 |
| 9,286,482 B1 * | 3/2016 | Dumont | G06F 21/32 |
| 10,178,432 B2 * | 1/2019 | Richman | H04N 21/4532 |
| 10,867,612 B1 * | 12/2020 | Pollack | G10L 17/10 |
| 10,945,080 B2 * | 3/2021 | Benattar | G06F 3/165 |
| 10,992,684 B2 * | 4/2021 | Carbune | H04L 63/107 |
| 2001/0039619 A1 | 11/2001 | Lapere et al. | |
| 2002/0010581 A1 * | 1/2002 | Euler | G10L 15/02 |
| | | | 704/236 |
| 2002/0104027 A1 * | 8/2002 | Skerpac | G07C 9/37 |
| | | | 726/28 |
| 2002/0120446 A1 * | 8/2002 | Chevalier | G10L 15/01 |
| | | | 704/246 |
| 2002/0184538 A1 | 12/2002 | Sugimura et al. | |
| 2003/0120626 A1 * | 6/2003 | Piotrowski | G06F 16/3334 |
| 2005/0163319 A1 | 7/2005 | Hancock et al. | |
| 2005/0171851 A1 | 8/2005 | Applebaum et al. | |
| 2006/0167784 A1 * | 7/2006 | Hoffberg | G06Q 50/188 |
| | | | 705/37 |
| 2007/0087756 A1 * | 4/2007 | Hoffberg | G06Q 20/40 |
| | | | 455/450 |
| 2007/0129946 A1 * | 6/2007 | Ma | G10L 13/027 |
| | | | 704/256 |
| 2009/0152343 A1 | 6/2009 | Carter et al. | |
| 2009/0206993 A1 | 8/2009 | Di Mambro et al. | |
| 2010/0085152 A1 | 4/2010 | Fukuda et al. | |
| 2010/0131273 A1 | 5/2010 | Aley-Raz et al. | |
| 2010/0144315 A1 | 6/2010 | Jayasuriya et al. | |
| 2010/0153110 A1 | 6/2010 | Chang | |
| 2010/0179813 A1 | 7/2010 | Summerfield et al. | |
| 2010/0303230 A1 | 12/2010 | Taveau et al. | |
| 2011/0040561 A1 | 2/2011 | Vair et al. | |
| 2011/0060592 A1 * | 3/2011 | Kang | H04N 21/440236 |
| | | | 704/275 |
| 2011/0112826 A1 | 5/2011 | Wang et al. | |
| 2011/0154460 A1 | 6/2011 | Khare et al. | |
| 2012/0130714 A1 | 5/2012 | Zeljkovic et al. | |
| 2012/0150748 A1 * | 6/2012 | Law | G06Q 20/389 |
| | | | 705/71 |
| 2012/0150750 A1 * | 6/2012 | Law | G06Q 30/0641 |
| | | | 705/76 |
| 2012/0197743 A1 * | 8/2012 | Grigg | G06Q 20/32 |
| | | | 705/16 |
| 2013/0225128 A1 | 8/2013 | Gomar | |
| 2013/0227651 A1 | 8/2013 | Schultz et al. | |
| 2014/0122087 A1 * | 5/2014 | Macho | G06F 1/3203 |
| | | | 704/275 |
| 2014/0379354 A1 * | 12/2014 | Zhang | G06Q 20/40145 |
| | | | 704/275 |
| 2015/0142438 A1 * | 5/2015 | Dai | G10L 17/02 |
| | | | 704/246 |
| 2015/0154603 A1 | 6/2015 | Song | |
| 2015/0340027 A1 * | 11/2015 | Wang | G10L 15/07 |
| | | | 704/221 |
| 2015/0363776 A1 * | 12/2015 | Gomez | G06Q 20/40 |
| | | | 705/44 |
| 2016/0012465 A1 * | 1/2016 | Sharp | G06Q 20/386 |
| | | | 705/14.17 |
| 2016/0049164 A1 * | 2/2016 | Nelson | G10L 15/02 |
| | | | 704/240 |
| 2016/0063498 A1 | 3/2016 | Li | |
| 2016/0063990 A1 * | 3/2016 | Nelson | G10L 15/02 |
| | | | 704/240 |
| 2016/0163332 A1 | 6/2016 | Un et al. | |
| 2016/0301639 A1 * | 10/2016 | Liu | H04L 51/32 |
| 2016/0328695 A1 * | 11/2016 | Lee | G06Q 20/327 |
| 2016/0351195 A1 * | 12/2016 | Falik | G10L 15/285 |
| 2017/0160813 A1 | 6/2017 | Divakaran et al. | |
| 2017/0206895 A1 * | 7/2017 | Tang | G10L 15/083 |
| 2018/0068317 A1 * | 3/2018 | Gilbey | G06Q 20/3674 |
| 2018/0338178 A1 * | 11/2018 | Richman | G06K 9/00926 |
| 2018/0365695 A1 * | 12/2018 | Liu | G06K 9/00885 |
| 2018/0366125 A1 * | 12/2018 | Liu | G10L 17/04 |
| 2018/0366128 A1 * | 12/2018 | Liu | G10L 17/22 |
| 2019/0005955 A1 * | 1/2019 | Bhattacharya | H04M 3/563 |
| 2019/0005956 A1 * | 1/2019 | Bhattacharya | H04L 65/1093 |
| 2019/0371320 A1 * | 12/2019 | Netzer | G10L 15/30 |

FOREIGN PATENT DOCUMENTS

| | | | | |
|---|---|---|---|---|
| CN | 104657857 A | | 5/2015 | |
| KR | 20060124062 A | * | 12/2006 | |
| WO | WO-2006087799 A1 | * | 8/2006 | ............ G10L 17/14 |
| WO | WO-2007043679 A1 | * | 4/2007 | ............ G06F 16/40 |
| WO | WO-2015096503 A1 | * | 7/2015 | ............ G06Q 20/12 |
| WO | WO-2019007249 A1 | * | 1/2019 | ............ G06F 21/32 |

OTHER PUBLICATIONS

Mikhail Gofman et al. "Multimodal Biometrics via Discriminant Correlation Analysis on Mobile Devices". Int'l Conf. Security and Management (SAM'18). Las Vegas, USA, Jul. 30-Aug. 2, 2018. pp. 174-181. ISBN: 1-60132-488-X (Year: 2018).*

Yang Wujian et al., "Application of Voice Recognition for Mobile E-commerce Security". 2011 Third Pacific-Asia Conference on Circuits, Communications and System (PACCS). Jul. 17-18, 2011. DOI: 10.1109/PACCS.2011.5990286 https://ieeexplore.IEEE.org/stamp/stamp.jsp?tp=&arnumber=5990286 (Year: 2011).*

Google Patents English Translation of WO-2006087799-A1. https://patents.google.com/patent/WO2006087799A1/en?oq=WO-2006087799-A1 (Year: 2006).*

Google Patents English Translation of WO-2015096503-A1. https://patents.google.com/patent/WO2015096503A1/en?oq=WO-2015096503-A1 (Year: 2015).*

Google Patents English Translation of WO-2007043679-A1. https://patents.google.com/patent/WO2007043679A1/en?oq=WO-2007043679-A1 (Year: 2007).*

Google Patents English Translation of KR-20060124062-A. https://patents.google.com/patent/KR20060124062A/en?oq=KR20060124062A (Year: 2006).*

Google Patents English Translation of WO-2019007249-A1. https://patents.google.com/patent/WO2019007249A1/en?oq=WO-2019007249-A1 (Year: 2019).*

Tsukayama, "Why it matters that Google Home can now identify you by voice," The Washington Post, Apr. 20, 2017, retrieved from: "https://www.washingtonpost.com/news/the-switch/wp/2017/04/20/why-it-matters-that-google-home-can-now-identify-you-by-voice/" (2 pages).

(56) References Cited

OTHER PUBLICATIONS

International Search Report and Written Opinion for Application No. PCT/US2018/037572, dated Sep. 6, 2018, 16 pages.
First Search for Chinese Application No. 201710457967.6 dated Jun. 29, 2021.

* cited by examiner

PAYMENT METHOD, CLIENT, ELECTRONIC DEVICE, STORAGE MEDIUM, AND SERVER

CROSS REFERENCE TO RELATED APPLICATIONS

The present application is based on and claims priority to the Chinese Application No. 201710457967.6, filed Jun. 16, 2017, the entire contents of which are incorporated herein by reference.

TECHNICAL FIELD

This application relates to the field of computer technologies, and in particular, to a payment method, a client, an electronic device, a storage medium, and a server.

BACKGROUND

In real life, people become more accustomed to online shopping. Such a shopping manner without leaving home brings convenience to people's life.

At present, people may perform online shopping by using a computer, a mobile phone, or the like. For example, people may use such devices to search for a product of interest, or browse a product recommended by a merchant. If a purchase operation is determined to be performed, a payment page is entered, and a user enters a payment password, to authenticate an identity of the user, and after the authentication succeeds, payment is performed.

In the prior art, when a user performs a payment operation during online shopping, in most cases, the user needs to manually enter a user name and a password. Such a manner is relatively complex and user experience is relatively poor.

SUMMARY

An objective of embodiments of this application is to provide a payment method, a client, an electronic device, a storage medium, and a server, so as to provide a secure and convenient payment method for a user.

To achieve the foregoing objective, an embodiment of this application provides a payment method. The method includes: receiving a payment instruction of a user; generating, according to audio information in a voice input of the user, a voice feature vector of the audio information; performing matching between the voice feature vector and a user feature vector; and when the matching succeeds, sending personal information associated with the user feature vector to a server, so that the server performs a payment operation for a resource account associated with the personal information.

An embodiment of this application further provides a client, including: a receiving module, configured to receive a payment instruction of a user; a generation module, configured to generate, according to audio information in a voice input of the user, a voice feature vector of the audio information; a matching module, configured to perform matching between the voice feature vector and a user feature vector; and a sending module, configured to: when the matching succeeds, send personal information associated with the user feature vector to a server, so that the server performs a payment operation for a resource account associated with the personal information.

An embodiment of this application provides a computer storage medium, storing program instructions, where when the program instructions are executed by a processor, the following operations are performed: receiving a payment instruction of a user for payment object information; generating, according to audio information in a voice input of the user, a voice feature vector of the audio information; performing matching between the voice feature vector and a user feature vector; and when the matching succeeds, sending the payment object information and personal information associated with the user feature vector to a server, so that the server performs a payment operation for a resource account associated with the personal information.

An embodiment of this application provides a payment method. The method includes: receiving a payment instruction of a user for payment object information; and sending at least one of audio information in a recorded user voice, a feature matrix generated according to the audio information, or a voice feature vector generated according to the audio information to a server, so that the server determines personal information of the user according to the audio information, the feature matrix, or the voice feature vector, to perform a payment operation for a resource account associated with the personal information.

An embodiment of this application provides a client, including: a receiving module, configured to receive a payment instruction of a user; and a sending module, configured to send at least one of audio information in a recorded user voice, a feature matrix generated according to the audio information, or a voice feature vector generated according to the audio information to a server, so that the server determines personal information of the user according to the audio information, the feature matrix, or the voice feature vector, to perform a payment operation for a resource account associated with the personal information.

An embodiment of this application provides a computer storage medium. The computer storage medium stores computer program instructions, and when the computer program instructions are executed by a processor, the following operations are performed: receiving a payment instruction of a user; and sending at least one of audio information in a recorded user voice, a feature matrix generated according to the audio information, or a voice feature vector generated according to the audio information to a server, so that the server determines personal information of the user according to the audio information, the feature matrix, or the voice feature vector, to perform a payment operation for a resource account associated with the personal information.

An embodiment of this application provides a payment method, applied to a server. The method includes: receiving audio information and payment object information that are sent by a client, where the audio information is a recorded user voice; generating a voice feature vector according to the audio information; performing matching between the voice feature vector and a user feature vector in the server, where a user feature vector that successfully matches the voice feature vector is a target feature vector; and performing a payment operation for the payment object information according to a resource account in personal information associated with the target feature vector.

An embodiment of this application provides a server, including: a receiving module, configured to receive audio information and payment object information that are sent by a client, where the audio information is a recorded user voice; a generation module, configured to generate a voice feature vector according to the audio information; a matching module, configured to perform matching between the voice feature vector and a user feature vector in the server, where a user feature vector that successfully matches the voice feature vector is a target feature vector; and a processing module, configured to perform a payment operation for the payment object information according to a resource account in personal information associated with the target feature vector.

An embodiment of this application provides an electronic device, including a network communication unit, a memory, and a processor, where the network communication unit is configured to receive audio information and payment object information that are sent by a client, where the audio information is a recorded user voice; the memory is configured to store a user feature vector, where the user feature vector is associated with personal information; and the processor is configured to: generate a voice feature vector according to the audio information; perform matching between the voice feature vector and the user feature vector in the memory, where a user feature vector that successfully matches the voice feature vector is a target feature vector; and perform a payment operation for the payment object information according to a resource account in personal information associated with the target feature vector.

An embodiment of this application provides a computer storage medium. The computer storage medium stores computer program instructions, and when the computer program instructions are executed by a processor, the following operations are performed: receiving audio information and payment object information that are sent by a client, where the audio information is a recorded user voice; generating a voice feature vector according to the audio information; performing matching between the voice feature vector and a user feature vector, where a user feature vector that successfully matches the voice feature vector is a target feature vector; and performing a payment operation for the payment object information according to a resource account in personal information associated with the target feature vector.

An embodiment of this application provides a payment method, applied to a server. The method includes: receiving a voice feature vector and payment object information that are sent by a client, where the voice feature vector is generated according to audio information in a user voice; performing matching between the voice feature vector and a user feature vector in the server, where a user feature vector that successfully matches the voice feature vector is a target feature vector; and performing a payment operation for the payment object information according to a resource account in personal information associated with the target feature vector.

An embodiment of this application provides a server, including: a receiving module, configured to receive a voice feature vector and payment object information that are sent by a client, where the voice feature vector is generated according to audio information in a user voice; a matching module, configured to perform matching between the voice feature vector and a user feature vector in the server, where a user feature vector that successfully matches the voice feature vector is a target feature vector; and a processing module, configured to perform a payment operation for the payment object information according to a resource account in personal information associated with the target feature vector.

An embodiment of this application provides an electronic device, including: a network communication unit, a memory, and a processor, where the network communication unit is configured to receive a voice feature vector and payment object information that are sent by a client, where the voice feature vector is generated according to audio information in a user voice; the memory is configured to store a user feature vector, where the user feature vector is associated with personal information; and the processor is configured to: perform matching between the voice feature vector and the user feature vector in the memory, where a user feature vector that successfully matches the voice feature vector is a target feature vector; and perform a payment operation for the payment object information according to a resource account in personal information associated with the target feature vector.

An embodiment of this application provides a computer storage medium. The computer storage medium stores computer program instructions, and when the computer program instructions are executed by a processor, the following operations are performed: receiving a voice feature vector and payment object information that are sent by a client, where the voice feature vector is generated according to audio information in a user voice; performing matching between the voice feature vector and a user feature vector, where a user feature vector that successfully matches the voice feature vector is a target feature vector; and performing a payment operation for the payment object information according to a resource account in personal information associated with the target feature vector.

An embodiment of this application provides a payment method. The method includes: recording audio information in a user voice; and sending the audio information to a server, so that the server identifies payment object information expressed in the audio information, and determines personal information of a user according to the audio information, to perform a payment operation for the payment object information according to a resource account associated with the personal information.

An embodiment of this application provides a payment method, applied to a server, where the server receives audio information provided by a client, where the audio information is generated by recording a user voice; and the method includes: determining payment object information according to the audio information, and generating a voice feature vector according to the audio information; performing matching between the voice feature vector and a user feature vector in the server, where a user feature vector that successfully matches the voice feature vector is a target user feature vector; and performing a payment operation for the payment object information according to a resource account in personal information associated with the target feature vector.

An embodiment of this application provides a server. The server includes: a receiving module, configured to receive audio information sent by a client, where the audio information is generated by recording a user voice; a determining module, configured to determine payment object information according to the audio information; a generation module, configured to generate a voice feature vector according to the audio information; a matching module, configured to perform matching between the voice feature vector and a user feature vector in the server, where a user feature vector that successfully matches the voice feature vector is a target user feature vector; and a processing module, configured to perform a payment operation for the payment object information according to a resource account in personal information associated with the target feature vector.

An embodiment of this application provides an electronic device, including a network communication unit, a memory, and a processor, where the network communication unit is configured to receive audio information provided by a client, where the audio information is generated by recording a user voice; the memory is configured to store a user feature vector, where the user feature vector is associated with personal information; and the processor is configured to: determine payment object information according to the audio information, and generate a voice feature vector according to the audio information; perform matching between the voice feature vector and the user feature vector in the memory, where a user feature vector that successfully matches the voice feature vector is a target user feature vector; and perform a payment operation for the payment object information according to a resource account in personal information associated with the target feature vector.

An embodiment of this application provides a computer storage medium. The computer storage medium stores computer program instructions, and when the computer program instructions are executed by a processor, the following operations are performed: receiving audio information provided by a client, where the audio information is generated by recording a user voice; determining payment object information according to the audio information, and generating a voice feature vector according to the audio information; performing matching between the voice feature vector and a user feature vector in a server, where a user feature vector that successfully matches the voice feature vector is a target user feature vector; and performing a payment operation for the payment object information according to a resource account in personal information associated with the target feature vector.

An embodiment of this application provides a payment method. The method includes: displaying a first interface including payment object information; receiving a payment request of a user, where the payment request indicates that the user expects to perform a payment operation for the payment object information; displaying a second interface including specified information; and recording audio information in a voice that is made by the user based on the specified information, to determine personal information of the user according to the audio information, so as to perform the payment operation for the payment object information according to a resource account in the personal information.

An embodiment of this application provides an electronic device, including a microphone unit and a network communication unit, where the microphone unit is configured to record audio information in a user voice; and the network communication unit is configured to send the audio information to a server, so that the server determines personal information of a user according to the audio information, to perform a payment operation for a resource account associated with the personal information.

An embodiment of this application provides an electronic device, including a microphone unit, a network communication unit, and a processor, where the microphone unit is configured to record audio information in a user voice; the processor is configured to generate a feature matrix according to the audio information, where the feature matrix is used to represent the audio information; and the network communication unit is configured to send the feature matrix to a server, so that the server determines personal information of a user according to the feature matrix, to perform a payment operation for a resource account associated with the personal information.

An embodiment of this application provides an electronic device, including a microphone unit, a network communication unit, and a processor, where the microphone unit is configured to record audio information in a user voice; the processor is configured to: generate a feature matrix according to the audio information, where the feature matrix is used to represent the audio information; and perform end-point detection processing on the feature matrix, to reduce data in a non-voice part; and the network communication unit is configured to send the processed feature matrix to a server, so that the server determines personal information of a user according to the feature matrix, to perform a payment operation for a resource account associated with the personal information.

An embodiment of this application provides an electronic device, including a microphone unit, a network communication unit, and a processor, where the microphone unit is configured to record audio information in a user voice; the processor is configured to generate a feature matrix according to the audio information; and generate a voice feature vector according to the feature matrix, where the voice feature vector is used to represent the audio information; and the network communication unit is configured to send the voice feature vector to a server, so that the server determines personal information of a user according to the voice feature vector, to perform a payment operation for a resource account associated with the personal information.

An embodiment of this application provides an electronic device, including a microphone unit, a network communication unit, and a processor, where the microphone unit is configured to record audio information in a user voice; the processor is configured to: generate a feature matrix according to the audio information; generate a voice feature vector according to the feature matrix, where the voice feature vector is used to represent the audio information; and perform matching between the voice feature vector and a stored user feature vector, to obtain a target feature vector matching the voice feature vector; and the network communication unit is configured to send personal information associated with the target feature vector to a server, so that the server performs a payment operation for a resource account associated with the personal information.

An embodiment of this application further provides a payment method. The method includes: receiving a payment instruction of a user; generating a voice feature of the audio information according to audio information in a voice input of the user; performing matching between the voice feature and a user feature; and when the matching succeeds, sending personal information associated with the user feature to a server, so that the server performs a payment operation for a resource account associated with the personal information.

It may be learned from the technical solutions provided in the foregoing embodiments of this application, in the embodiments of this application, matching is performed between a voice feature vector and a user feature vector, to authenticate an identity of a user, thereby simplifying a payment procedure for the user, and improving use experience of the user. Further, because each user has a respective voice feature, the identity of the user is authenticated by using the voice feature, so that relatively high reliability can be achieved. An identity of a user is authenticated by using a voice, so that hands of the user can be freed; and a requirement for light or the like in an environment is relatively low, so that the technical solutions provided in the embodiments adapt to a relatively broad range of scenarios.

BRIEF DESCRIPTION OF THE DRAWINGS

To describe the technical solutions in the embodiments of this application or in the prior art more clearly, the following briefly describes the accompanying drawings required for describing the embodiments or the prior art. Apparently, the accompanying drawings in the following description show merely some embodiments in this application, and a person of ordinary skill in the art may still derive other drawings from these accompanying drawings without creative efforts.

DETAILED DESCRIPTION OF EMBODIMENTS

To make a person skilled in the art understand the technical solutions in this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

An embodiment of this application provides a voice feature vector generation method. The generation method may include extracting a feature from audio information, and generating a voice feature vector that can represent the audio information.

Figure 1:
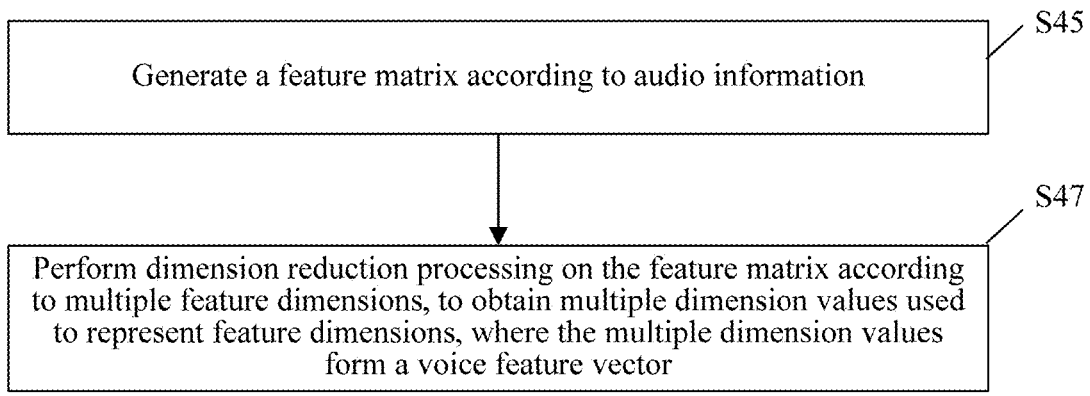
FIG. 1 is a schematic flowchart of a voice feature vector generation method according to an embodiment of this application.

In this embodiment, the audio information may be audio data of particular duration that is recorded by a recording device. The audio information may be a recording of a user voice. Referring to FIG. 1, the generation method may include the following steps.

Step S45: Generate a feature matrix according to the audio information.

In this embodiment, data may be acquired from the audio information according to a preset algorithm, and the feature matrix including a feature of audio data in the audio information is output. A voice of a user has a feature of the user, such as a timbre, an intonation, or a speaking speed. When the audio information is recorded, a voice feature of each user may be embodied by a frequency, an amplitude, or the like in the audio data. The feature matrix generated based on the audio information according to the preset algorithm includes a feature of the audio data in the audio information. Further, the voice feature vector generated based on the feature matrix may be used to represent the audio information and the audio data. The preset algorithm may be a mel-frequency cepstrum coefficient (MFCC), a mel-frequency spectral coefficient (MFSC), a fractional mel frequency cepstrum coefficient (FMFCC), a DMFCC (Discriminative), a linear prediction cepstrum coefficient (LPCC), or the like. Certainly, inspired by the technical essence of this application, a person skilled in the art may further use other algorithms to generate the feature matrix of the audio information, and the other algorithms shall all fall with the protection scope of this application as long as functions and effects that are achieved by the other algorithms are the same as or similar to those of a manner in this application.

Step S47: Perform dimension reduction processing on the feature matrix according to multiple feature dimensions, to obtain multiple dimension values used to represent feature dimensions, where the multiple dimension values form the voice feature vector.

In this embodiment, dimension reduction processing may be performed on the feature matrix according to different feature dimensions, to obtain a dimension value that can represent each feature dimension. Further, the dimension values are arranged according to a specified order, to form the voice feature vector of the audio information. Specifically, dimension reduction processing may be performed on the feature matrix by using a convolutional or mapping algorithm. In a specific example, dimension reduction may be performed on the feature matrix according to different dimensions by using a deep neural network (DNN), a convolutional neural network (CNN), a recurrent neural network (RNN), a deep learning algorithm, or a combination of the foregoing algorithms.

In an embodiment, to further distinguish between audio data of a user voice in audio information and audio data of a non-user voice, the voice feature vector generation method may further include endpoint detection processing. Further, data corresponding to audio data of a non-user voice in the feature matrix may be reduced. In this way, a degree of association between the generated voice feature vector and the user can be improved to some extent. An endpoint detection processing method may include, but is not limited to, energy based endpoint detection, endpoint detection based on a cepstral feature, endpoint detection based on information entropy, endpoint detection based on a self-correlated similarity distance, or the like. Examples are not listed herein.

An embodiment of this application provides a method for acquiring audio information of a user. Audio information of a user may be acquired by using a client.

In this embodiment, the client may be an electronic device having a recording function. Specifically, for example, the client may be a desktop computer, a tablet computer, a notebook computer, a smartphone, a digital assistant, a smart wearable device, a shopping guide terminal, a television, an intelligent voice box, or a microphone. The smart wearable device includes, but is not limited to, a smart band, a smartwatch, smart glasses, a smart helmet, a smart necklace, or the like. Alternatively, the client may be software run in the electronic device. For example, the electronic device provides the recording function, and software may invoke the recording function to record audio information.

In this embodiment, when the user operates and enables the recording function, the client may start to record a user voice, to generate audio information. Alternatively, the client may automatically enable the recording function. For example, a specified condition is set for the client, and when the condition is satisfied, the recording function is enabled. Specifically, for example, a time is specified, and recording is enabled when the time is reached; or a location is specified, and recording is enabled when the location is reached; or an ambient sound volume is set, and recording is started when an ambient sound volume satisfies the specified condition. In this embodiment, there may be one or more pieces of generated audio information. Specifically, in a recording process, the client may use all continuous content in the recording process as one piece of audio information. Alternatively, in a recording process, the client may obtain by division multiple pieces of audio information. For example, audio information is obtained by division according to duration of a recording. For example, one piece of audio information is formed each time when recording is performed for five minutes. Alternatively, audio information is obtained by division according to a data amount. For example, each piece of audio information is of at most 5 MB.

Figure 2:
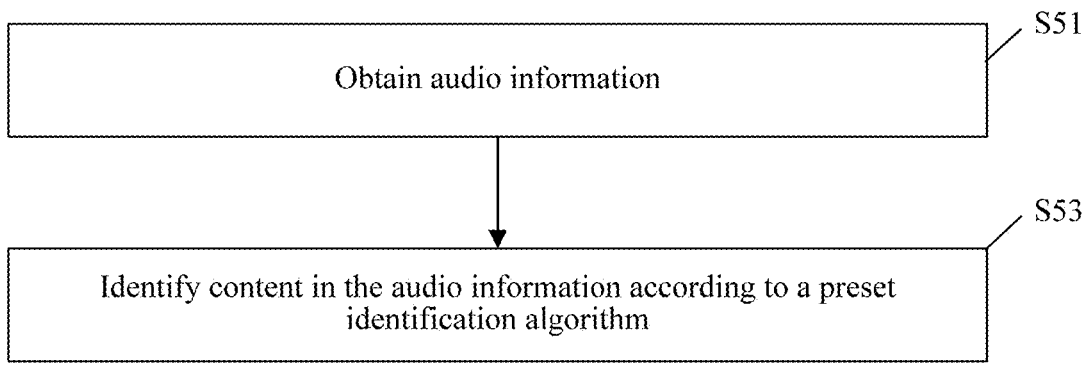
FIG. 2 is a flowchart of a voice recognition method according to an embodiment of this application.

Referring to FIG. 2, an embodiment of this application provides a voice recognition method. The voice recognition method may be identifying, from audio data, content expressed by a user, to provide an input method for the user. The voice recognition method may include the following steps:

Step S51: Obtain audio information.

Step S53: Identify content in the audio information according to a preset identification algorithm.

In this embodiment, a user instruction set may be predefined, and the user instruction set includes at least one user instruction. A user instruction may point to a specific function. When a user instruction is identified from audio data of a user, it may indicate that a function pointed to by the user instruction needs to be performed. Alternatively, content expressed in a user voice may be obtained by using only the preset identification algorithm. Specifically, the preset identification algorithm may use a hidden Markov algorithm, a neural network algorithm, or the like, and voice recognition is performed on the audio information.

An embodiment of this application provides a user registration method. In the user registration method, a voice feature of a user may be associated with identity information of the user.

In this embodiment, audio information of the user may be obtained by using an audio information acquisition method. Audio data in the audio information may be a recording of a user voice. In this way, a voice feature vector generated according to the audio information may correspondingly represent audio information, and may also represent some voice features of the user. Growth and development processes of users are different from each other. Therefore, a user voice has a particular voice feature. Further, different users are distinguished by using voice features of the users. In this way, the voice feature vector may represent some voice features of the user and then may be used to identify the user.

In this embodiment, there may be one or more pieces of audio information acquired for the user, and a corresponding voice feature vector may be generated for each piece of corresponding audio information by using an audio information processing method. Certainly, in some cases, calculation processing may be performed on more than one piece of audio information at the same time according to the audio information processing method, to obtain a voice feature vector. In this case, the voice feature vector may correspond to the more than one piece of audio information.

In this embodiment, a user feature vector that can be used to identify the user is determined according to the obtained voice feature vector. Specifically, for example, if only one voice feature vector is generated, the voice feature vector may be used as the user feature vector of the user; if multiple voice feature vectors are generated, a voice feature vector that represents a relatively large quantity of voice features of the user may be selected from the multiple voice feature vectors, as the user feature vector of the user; or if multiple voice feature vectors are generated, further calculation processing may be performed on some or all of the multiple voice feature vectors, to output the user feature vector of the user. The calculation processing may include, but is not limited to, obtaining a sum of corresponding dimensions of the multiple voice feature vectors, and then, further calculating an average value. Certainly, other algorithms may be used. For example, during calculation processing, a weighed sum of the multiple voice feature vectors may be obtained.

In this embodiment, the user feature vector of the user is associated with personal information of the user, to complete registration of the user. The personal information of the user may be used to represent one user. The personal information of the user may include, but is not limited to, a user name, a nickname, a real name, a gender, a telephone number, a communication address, or the like. The user feature vector is associated with the personal information of the user, to acquire audio information of a user voice, and then, the personal information of the user may be determined by associating a voice feature vector of the audio information with the user feature vector.

recorded. For example, the user says a sentence to a microphone. In this case, the client obtains audio information in a voice input of the user. According to the foregoing voice feature vector generation method, a voice feature vector is generated according to the audio information.

In this embodiment, matching is performed between the voice feature vector and the user feature vector, and when the matching succeeds, the personal information associated with the user feature vector is used as identity information of the user. Specifically, a manner of performing matching between the voice feature vector and the user feature vector may be performing calculation according to the voice feature vector and the user feature vector, and when there is a relationship between the voice feature vector and the user feature vector, it may be considered that the matching succeeds. Specifically, for example, a difference between the voice feature vector and the user feature vector is obtained and then a sum is obtained, and an obtained value is used as a matching value. The matching value is compared with a specified threshold, and when the matching value is less than or equal to the specified threshold, it is considered that the matching between the voice feature vector and the user feature vector succeeds. Alternatively, a sum of the voice feature vector and the user feature vector may be directly obtained, and an obtained value is used as a matching value. When the matching value is greater than or equal to a specified threshold, it is considered that the matching between the voice feature vector and the user feature vector succeeds.

An embodiment of this application further provides a network interaction system. The network interaction system includes a client and a server.

In this embodiment, the client may be an electronic device having a recording function. Clients may be classified into the following categories according to different data processing capabilities.

TABLE 1

| Category number | Category name | Exemplary device | Data processing capability |
| --- | --- | --- | --- |
| 1 | Basic network device | Internet of things device, and endpoint device | Data acquisition and sending |
| 2 | Simple network device | Smart wearable device, and point of sale (POS) | Data acquisition and sending, and simple data preprocessing |
| 3 | Intermediate network device | Smart appliance, and intelligent voice box | Data acquisition and sending, and data preprocessing with intermediate power consumption |
| 4 | Intelligent network device | Smartphone with relatively good performance, and tablet computer | Data acquisition and sending, data preprocessing with relatively high power consumption, and data querying and matching |
| 5 | High-performance device | Work station, and smart telephone box | Data acquisition and sending, data preprocessing, data querying and matching, and data storage |

An embodiment of this application further provides an identity identification method. In the identity identification method, an identity of a user may be identified according to audio information in a user voice.

In this embodiment, the user may first perform registration by using the user registration method, and then a user feature vector of the user is obtained. The user feature vector may be stored in a client or may be stored in a server. Correspondingly, the user feature vector is associated with personal information of the user.

In this embodiment, when the identity of the user needs to be identified, the audio information of the user voice may be In this embodiment, a hardware device of a basic network device is relatively simple, and may perform recording by using a microphone, to generate audio information, and send the generated audio information to a server by using a network communication module. The basic network device may include the microphone, the network communication unit, a sensor, and a speaker. Basically, the basic network device does not need to process data. Another sensor may be further disposed in the basic network device, and is configured to acquire a working parameter of the basic network device. Specifically, for example, the basic network device may be an Internet of things device or an edge point device.

In this embodiment, a simple network device may mainly include a microphone, a network communication unit, a processor, a memory, a speaker, and the like. Compared with the basic network device, a data processing capability of the simple network device is enhanced. The simple network device may include the processor that can process simple logic calculation, so that after acquiring data, the simple network device may perform preliminary preprocessing on the data, for example, may generate a feature matrix according to audio information. The simple network device may include a display module having a simple display function, which may be configured to feedback information to a user. Specifically, for example, the simple network device may be a smart wearable device or a POS, for example, a smart band, a relatively primary smartwatch, smart glasses, a settlement device (such as a POS) in an offline shopping place, or a mobile settlement device (such as a handheld POS or a settlement module added to a handheld device).

In this embodiment, an intermediate network device may mainly include a microphone, a network communication unit, a processor, a memory, a display, a speaker, and the like. A dominant frequency of the processor of the intermediate network device is usually less than 2.0 GHz, and a memory capacity of the processor is usually less than 2 GB. A capacity of the memory is usually less than 128 GB. The intermediate network device may process recorded audio information to some extent, for example, generate a feature matrix, and perform endpoint detection processing, noise reduction processing, voice recognition, or the like on the feature matrix. Specifically, for example, the intermediate network device may include a smart appliance in a smart household, a smart home terminal, an intelligent voice box, a relatively advanced smartwatch, a relatively primary smartphone (for example, a price thereof is approximately RMB 1000), or an in-vehicle intelligent terminal.

In this embodiment, an intelligent network device may mainly include hardware such as a microphone, a network communication unit, a processor, a memory, a display, and a speaker. The intelligent network device may have a relatively powerful data processing capability. A dominant frequency of the processor of the intelligent network device is usually greater than 2.0 GHz, and a memory capacity of the processor is usually less than 12 GB. A capacity of the memory is usually less than 1 TB. After a feature matrix is generated according to audio information, endpoint detection processing, noise reduction processing, voice recognition, or the like may be performed. Further, the intelligent network device may further generate a voice feature vector according to the audio information. In some cases, matching may be performed between the voice feature vector and a user feature vector, to identify an identity of a user. However, such matching is limited to a limited quantity of user feature vectors, for example, user feature vectors of family members in a family. Specifically, for example, the intelligent network device may include a smartphone with relatively good performance, a tablet computer, a desktop computer, a notebook computer, or the like.

In this embodiment, a high-performance device may mainly include hardware such as a microphone, a network communication unit, a processor, a memory, a display, and a speaker. The high-performance device may have a large-scale data calculation processing capability, and may further provide a powerful data storage capability. A dominant frequency of the processor of the high-performance device is usually higher than 3.0 GHz, and a memory capacity of the processor is usually greater than 12 GB. A capacity of the memory may be higher than 1 TB. The high-performance device may generate a feature matrix according to audio information, perform endpoint detection processing, noise reduction processing, or voice recognition, to generate a voice feature vector, and perform matching between the voice feature vector and a large quantity of stored user feature vectors. Specifically, for example, the high-performance device may be a work station, a desktop computer with very high configurations, a Kiosk smart telephone box, or a self-service machine.

Some exemplary clients are listed above. With the advancement of science and technology, performance of a hardware device may be improved, so that the foregoing current electronic device with a relatively weak data processing capability may have a relatively powerful processing capability. Content in Table 1 is referenced for an embodiment blow, is merely used as an example for reference, and does not constitute a limitation.

In this embodiment, the server may be an electronic device having a particular calculation processing capability. The server may include a network communication terminal, a processor, a memory, and the like. Certainly, the server may be software run in the electronic device. Alternatively, the server may be a distributed server, or may be a system in which multiple processors, a memory, a network communication module, and the like cooperatively operate. Alternatively, the server may be a server cluster formed by several servers. In this embodiment, the server may be configured to manage a user feature vector. After the user completes registration, a user feature vector of the user may be stored in the server.

An embodiment of this application provides an electronic device. The electronic device may include a microphone unit and a network communication unit.

The microphone unit may record audio information in a user voice.

The network communication unit may send the audio information to a server, so that the server determines personal information of a user according to the audio information, to perform a payment operation for a resource account associated with the personal information.

In this embodiment, the electronic device may record the audio information, and send the audio information to the server. The electronic device may perform no processing on the generated audio information, but directly sends the audio information to the server.

In this embodiment, the server may generate a voice feature vector according to the audio information, and perform matching between the voice feature vector and a user feature vector, to authenticate an identity of the user. Personal information associated with a user feature vector that successfully matches the voice feature vector is used as the identity of the user.

In this embodiment, the resource account associated with the personal information may be account information included in the personal information or account information bound with the personal information. A storage structure is set by using a database, and when the personal information is determined, the corresponding resource account can be determined.

In this embodiment, the payment operation may be that the user needs to pay a virtual resource externally from the resource account, to buy a product or a service. Specifically, for example, if the user uses online shopping software "Mobile JD" to buy a washing machine, a payment operation of the user is that the user pays, from a bank card account of the user, a required amount of money to a seller or a third party as an intermediary in a secured transaction.

In this embodiment, the electronic device may be a device of any category in Table 1.

An embodiment of this application provides an electronic device. The electronic device may include a microphone unit, a network communication unit, and a processor.

The microphone unit may generate audio information according to a voice input of a user.

The processor may generate a feature matrix according to the audio information, where the feature matrix is used to represent the audio information.

The network communication unit may send the feature matrix to a server, so that the server determines personal information of a user according to the feature matrix, to perform a payment operation for a resource account associated with the personal information.

In this embodiment, that the audio information is generated according to the voice input of the user may be that a client records the user voice into an audio file by using the microphone unit.

In this embodiment, based on the recorded audio information, the electronic device may generate the feature matrix according to the audio information, and send the feature matrix to the server. In this way, an amount of data transmitted in a network can be reduced, and an entire processing speed can be increased. Further, a calculation amount of the server is reduced, and working load of the server is reduced.

In this embodiment, the electronic device may be a device of any category with the category number from 2 to 5 in Table 1.

An embodiment of this application further provides an electronic device. The electronic device includes a microphone unit, a network communication unit, and a processor.

The microphone unit is configured to generate audio information according to a voice input of a user.

The processor is configured to: generate a feature matrix according to the audio information, where the feature matrix is used to represent the audio information; and perform endpoint detection processing on the feature matrix, to reduce data in a non-voice part.

The network communication unit is configured to send the processed feature matrix to a server, so that the server determines personal information of the user according to the feature matrix, to perform a payment operation for a resource account associated with the personal information.

In this embodiment, by means of endpoint detection processing, the voice feature vector generated according to the feature matrix can more accurately represent a user voice feature, thereby reducing interference from a non-user voice. Further, a data amount of the feature matrix can be further reduced, thereby reducing load of network transmission and the server.

In this embodiment, the electronic device may be a device of any category with the category number from 3 to 5 in Table 1, or may be a device of the category 2 with relatively excellent hardware configurations and performance.

An embodiment of this application further provides an electronic device. The electronic device may include a microphone unit, a network communication unit, and a processor.

The microphone unit may generate audio information according to a voice input of a user.

The processor may generate a feature matrix according to the audio information; and generate a voice feature vector according to the feature matrix, where the voice feature vector is used to represent the audio information.

The network communication unit may send the voice feature vector to a server, so that the server determines personal information of the user according to the voice feature vector, to perform a payment operation for a resource account associated with the personal information.

In this embodiment, based on generating the feature matrix according to the audio information, the electronic device generates, based on the feature matrix, the voice feature vector that can represent the audio information. An amount of data that needs to be transmitted in a network is further reduced, and calculation load of the server is reduced.

In this embodiment, after receiving the voice feature vector, the server may perform matching between the voice feature vector and a user feature vector, to obtain a user feature vector matching the voice feature vector. Personal information associated with the user feature vector obtained by matching may be used as an identity of the user.

In this embodiment, the electronic device may be a device of any category with the category number 4 or 5 in Table 1, or may be a device of the category 3 with relatively excellent hardware configurations and performance.

An embodiment of this application further provides an electronic device. The electronic device may include a microphone unit, a network communication unit, and a processor.

The microphone unit may generate audio information according to a voice input of a user.

The processor may generate a feature matrix according to the audio information; generate a voice feature vector according to the feature matrix, where the voice feature vector is used to represent the audio information; and perform matching between the voice feature vector and a stored user feature vector, to obtain a target feature vector matching the voice feature vector.

The network communication unit may send personal information associated with the target feature vector to a server, so that the server performs a payment operation for a resource account associated with the personal information.

In this embodiment, after generating the voice feature vector, the electronic device may perform matching between the voice feature vector and the user feature vector. The electronic device may store the user feature vector. A user represented by the user feature vector may be a family member, or may be any person that performs user registration with the electronic device.

In this embodiment, the electronic device may be a device with the category number 5 in Table 1, or may be a device of the category 4 with relatively excellent hardware configurations and performance.

Figure 3:
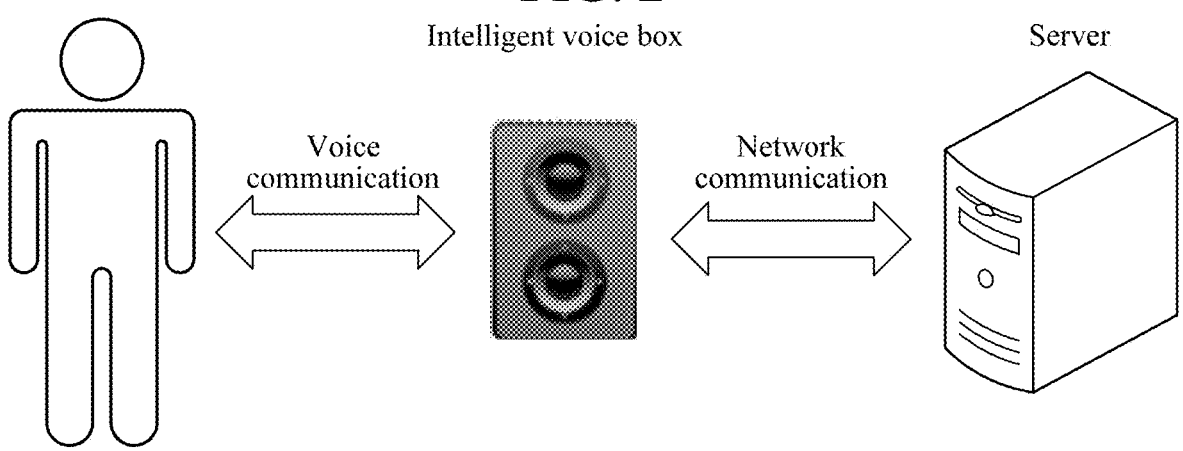
FIG. 3 is a schematic diagram of an application scenario of a payment method according to an embodiment of this application.
Figure 4:
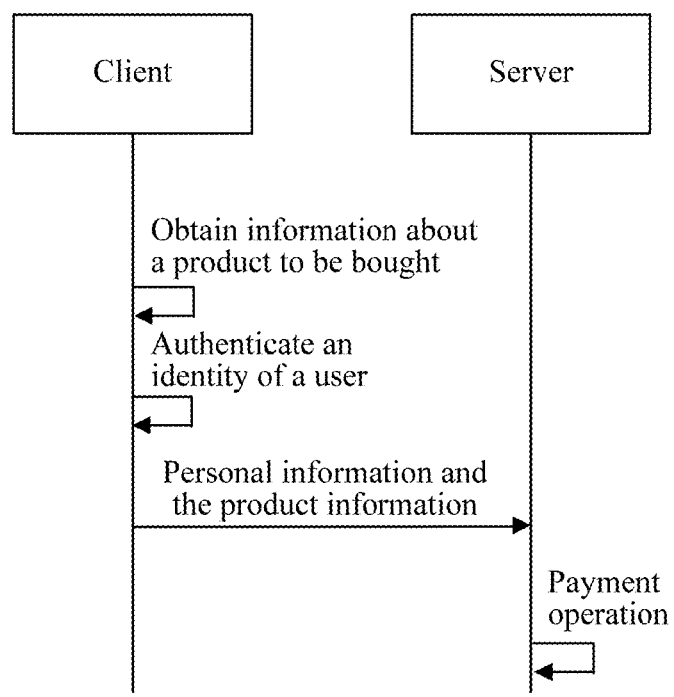
FIG. 4 is a schematic flowchart of a payment method according to an embodiment of this application.

Referring to both FIG. 3 and FIG. 4, in an exemplary scenario, the client may be a smart appliance having a particular calculation capability. For example, the client may be a device of the category 3 in Table 1. In a household scenario, the client may be manufactured into an intelligent voice box. The intelligent voice box may include a microphone, a speaker, a WiFi module, a memory, a processor, and the like. The intelligent voice box can achieve an ordinary audio playing function, and is equipped with a processing device and a network device, to have a dialog with the user and exchange data with the server, so as to achieve a shopping function.

In this exemplary scenario, the intelligent voice box may enable a further function by identifying a wakeup keyword. Before identifying the wakeup keyword said by the user, the intelligent voice box may be in a standby state. When the user needs to use the intelligent voice box, the user may say "Hello, voice box". The intelligent voice box records a user voice, and identifies that content in the user voice is the wakeup keyword. In this case, the intelligent voice box may reply the user with "Hello, May I help you?" by using speaker.

In this exemplary scenario, the user wants to buy an air purifier. The user may say "I want to buy an air purifier. What would you recommend?". After generating audio information by means of recording by the microphone, the intelligent voice box identifies the foregoing product description information, queries a product information set in the memory for product information of an air purifier, to obtain two recommendation results, and plays a voice "There are two products to recommend, the first is the second-generation MI air purifier, and the second is the Midea KJ210G-C46 air purifier" by using the speaker. The user may say "I want to buy the second-generation MI air purifier". After recording and identifying the audio information, the intelligent voice box determines that product information for purchase is the second-generation MI air purifier. Alternatively, the intelligent voice box may send the product description information to the server, and receive a recommendation result provided by the server.

In this exemplary scenario, the intelligent voice box may ask the user "Do you need to pay for it now?", and the user may reply with "yes". The intelligent voice box may generate a text according to a preset random algorithm, and inform the user of "Please listen and repeat this segment of digits: 57463". The intelligent voice box may identify whether content said by the user is the specified digits, to determine whether the user has an actual intention to perform payment. If the use says "Forget it, I won't buy it", the intelligent voice box may end the current purchase procedure. The user may say "57463". In this case, the intelligent voice box finds that identified content said by the user is the same as the specified digits, and considers that the user really has a purchase intention.

In this exemplary scenario, the intelligent voice box may generate a voice feature vector according to audio information obtained after the user listens to and repeats the digits, and perform matching between the voice feature vector and a user feature vector stored in the memory of the intelligent voice box. The user feature vector may be registered by the user in the intelligent voice box in advance, so that the intelligent voice box includes the user feature vector of the user. Certainly, if no registration is performed before, a registration procedure may be started immediately.

In this exemplary scenario, the matching between the stored user feature vector and the voice feature vector succeeds in the intelligent voice box. In this case, the intelligent voice box completes identity authentication on the user, and may send, to the server, personal information of the user and information about the product to be bought, so that the server pays, from a financial account of the user, a required amount of money in the product information to a seller of the product.

Figure 38:
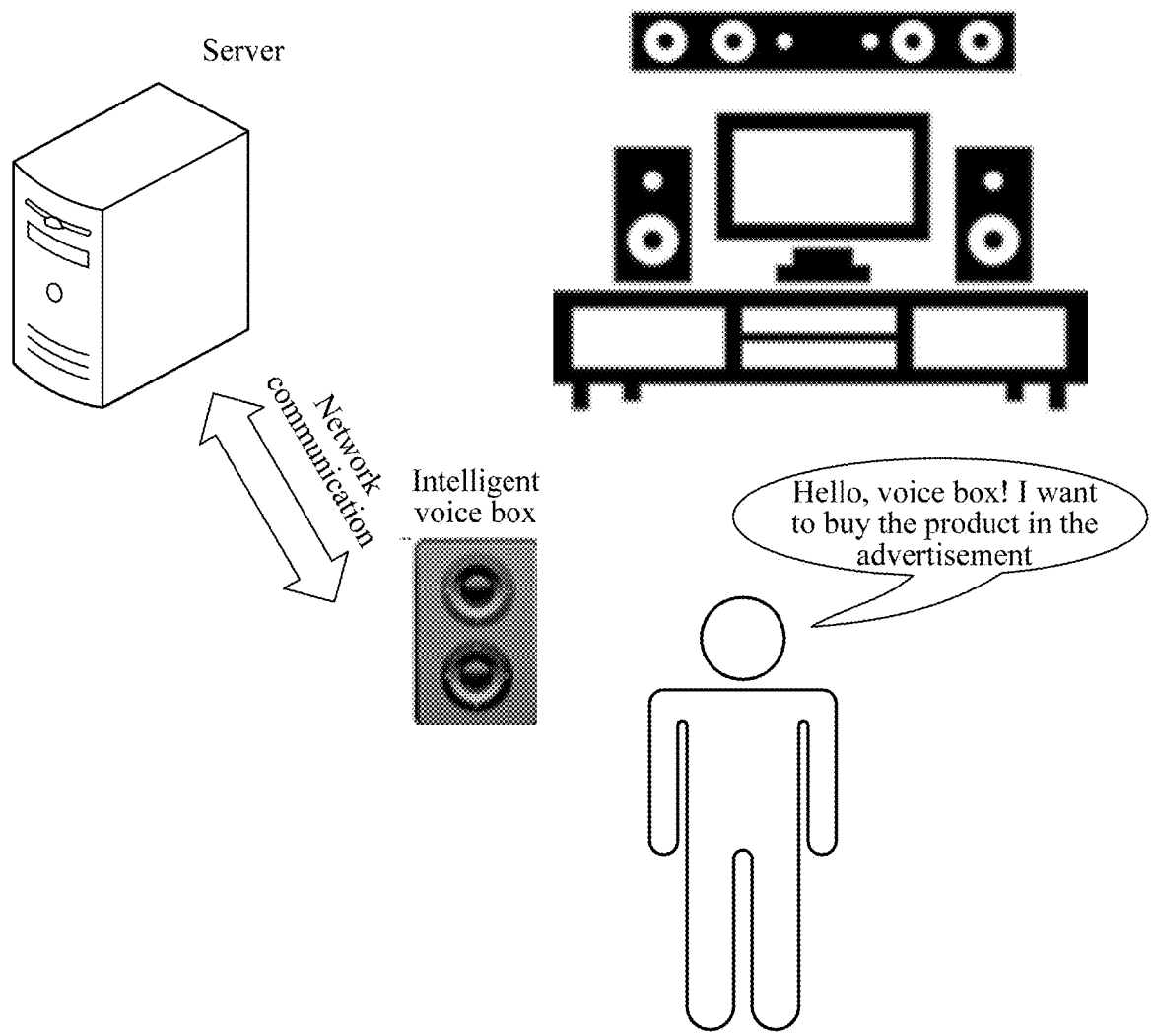
FIG. 38 is a schematic diagram of an application scenario of a payment method according to an embodiment of this application.

Referring to FIG. 38, in an exemplary scenario, the intelligent voice box may actively predict a product or a service that the user focuses on.

In this exemplary scenario, the intelligent voice box may be located in a living room in a household of the user. In a process in which the user watches television, the intelligent voice box may record a television sound, to obtain audio information, and further obtains by identification a channel code. Alternatively, the intelligent voice box may identify content in a television program, and interact with the server; and the server feeds back a corresponding television channel.

In this exemplary scenario, the intelligent voice box may store a program list of television channels. Alternatively, a program list of television channels may be pulled from the server. In a process in which the user watches television, the user may be interested in a product in an advertisement and wants to buy it. In this case, the user may say "Hello, voice box", and "I want to buy the product in the advertisement". The intelligent voice box may determine, according to a time point at which the user speaks and a time provided in the program list, information about the product that the user wants to buy. Further, the intelligent voice box may generate a voice feature file according to audio information in a user voice, to perform matching, so as to authenticate an identity of the user. When the authentication succeeds, personal information of the user and the product information are sent to the server, so that the server pays, from a financial account of the user, a required amount of money in the product information to a seller of the product.

Figure 39:
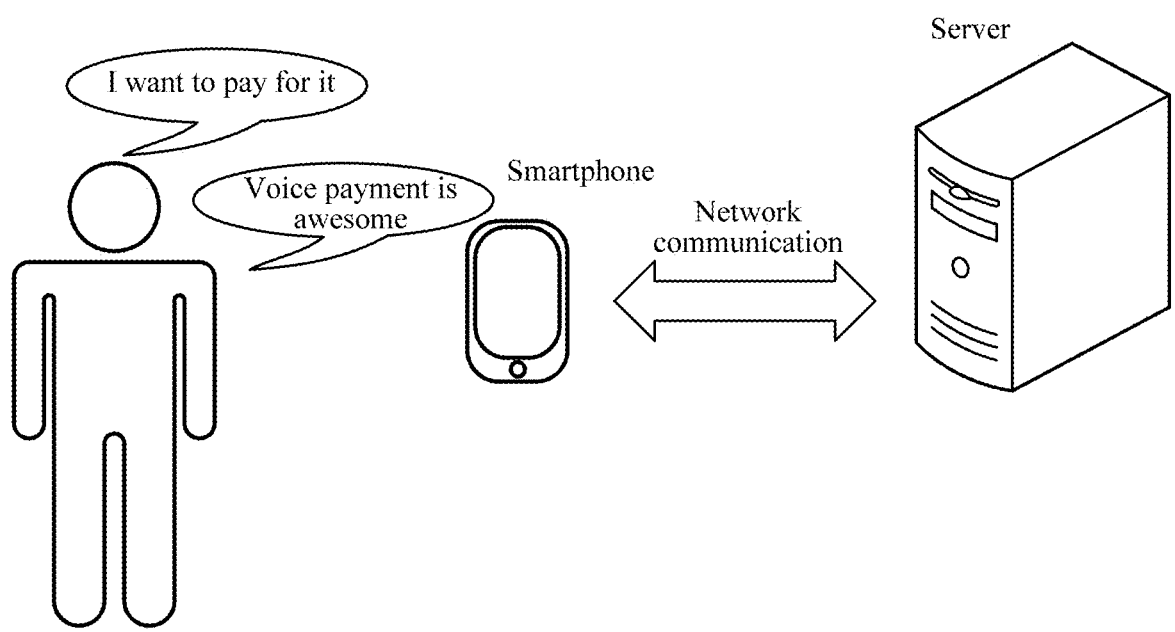
FIG. 39 is a schematic diagram of an application scenario of a payment method according to an embodiment of this application.

Referring to both FIG. 4 and FIG. 39, in a exemplary scenario, the client may be an electronic device including a display. For example, the client may be a device of the category 4 in Table 1. Specifically, for example, the client may be a smartphone.

In this exemplary scenario, the user may want to buy a headset. The user may use shopping software such as Mobile JD, Dangdang, or Amazon, to operate and browse product information.

In this exemplary scenario, the user may completely browse the product information, and when the user wants to pay for a headset priced at RMB 150, the user may keep an interface of the product information on the mobile phone, and say "I want to pay for it" to the mobile phone. In this case, the mobile phone may record audio information in the voice and obtain by identification an instruction of the user, and then, the mobile phone may provide a payment interface to the user. Alternatively, the user taps a payment button, and the mobile phone provides a payment interface. The user may directly say a preset payment keyword in the payment interface. For example, the user says "The voiceprint payment method makes life convenient", and the mobile phone performs recording to generate audio information, and may generate a voice feature vector according to the audio information. Matching is performed between the voice feature vector and a user feature vector stored in the mobile phone, to authenticate an identity of the user. When the matching succeeds, the mobile phone may send personal information of the user and the product information to the server, so that the server pays, from a financial account of the user, a required amount of money in the product information to a seller of the product.

Figure 12:
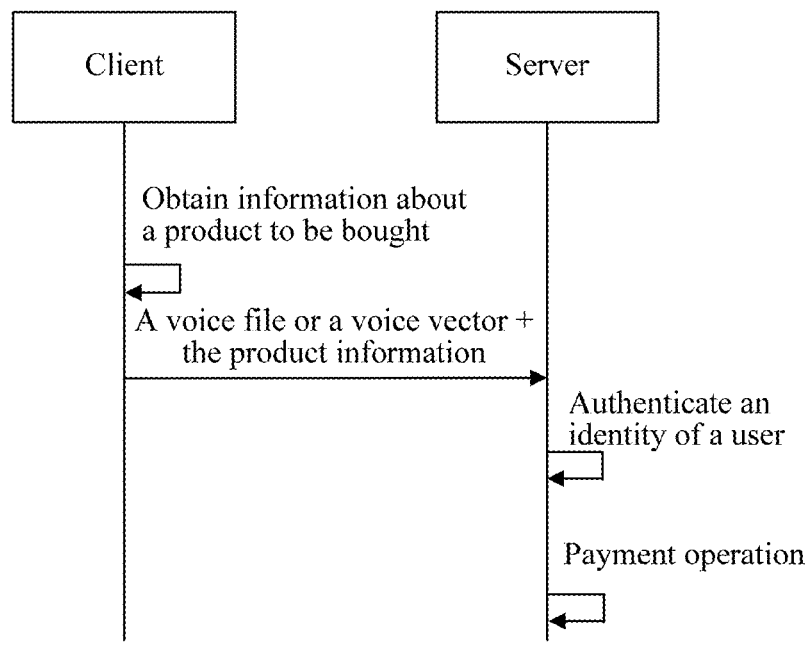
FIG. 12 is a schematic flowchart of a payment method according to an embodiment of this application.
Figure 40:
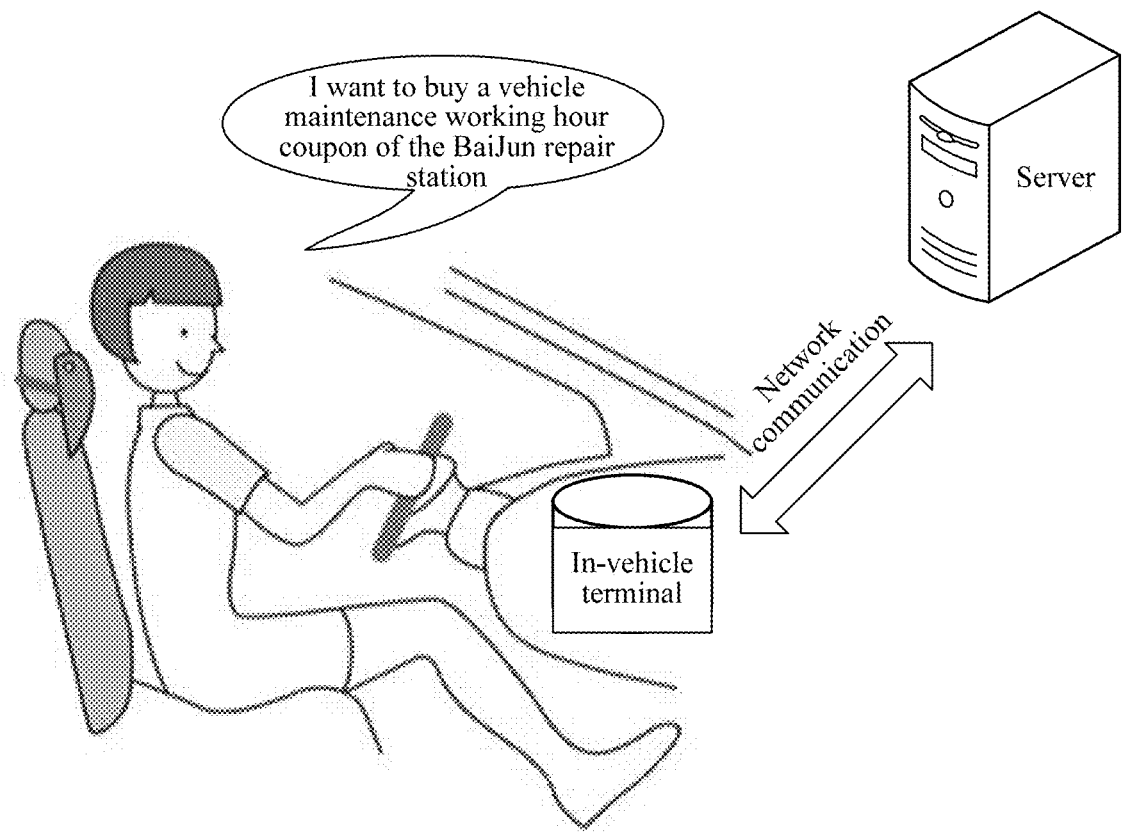
FIG. 40 is a schematic diagram of an application scenario of a payment method according to an embodiment of this application.

Referring to both FIG. 12 and FIG. 40, in a specific exemplary scenario, the client may be an in-vehicle terminal. The in-vehicle terminal may have a dialog with the user, and perform further processing and determine that the user wants to buy a service exchange coupon, for example, a vehicle maintenance working hour coupon priced at RMB 50. The in-vehicle terminal may send both a record user voice file and information about the vehicle maintenance working hour coupon to the server. The server performs an identity authentication process.

In this exemplary scenario, audio information provided by the in-vehicle terminal to the server may be a recording of sending a purchase instruction by the user. For example, the user says "I want to buy a vehicle maintenance working hour coupon of the BaiJun repair station", and the in-vehicle terminal sends audio information in the sentence to the server.

In this exemplary scenario, after receiving the audio information and service information, the server may generate a voice feature vector according to the audio information. Matching is performed between the voice feature vector and a user feature vector in the server, to authenticate an identity of the user. For example, the authentication succeeds, and personal information of the user is obtained according to the user feature vector that successfully matches, so as to pay, from a financial account in the personal information, the BaiJun repair station for the vehicle maintenance working hour coupon.

In this exemplary scenario, alternatively, after recording audio information, the in-vehicle terminal may generate a feature matrix of the audio information, and send the feature matrix and service information to the server. Therefore, it is convenient for the server to generate a voice feature vector according to the feature matrix, to authenticate an identity of the user.

Figure 41:
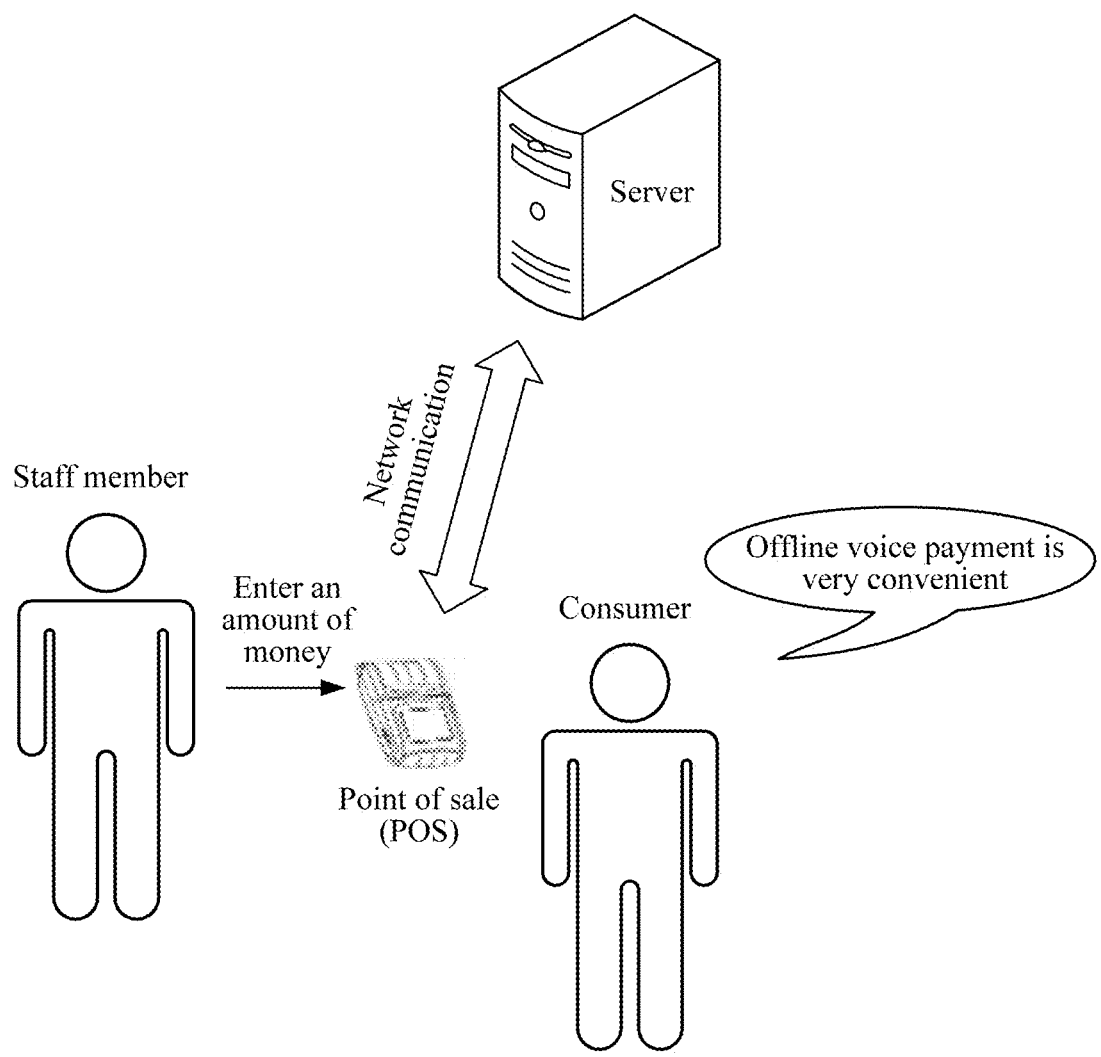
FIG. 41 is a schematic diagram of an application scenario of a payment method according to an embodiment of this application.

Referring to FIG. 12 and FIG. 41, in a specific exemplary scenario, the client may be an electronic terminal in a cashier in an offline site. For example, the electronic terminal may be a device of the category 2 in Table 1. Specifically, for example, the electronic terminal may be a POS. A microphone may be disposed in the electronic terminal, to record audio information in a consumer voice.

In this exemplary scenario, a consumer may select a product in the offline site, for example, buy a piece of clothing. When the consumer to perform payment at the cashier, a staff member may enter price information to the electronic terminal, and instruct the consumer to say a sentence to the microphone, to record audio information of the consumer. The electronic terminal may send the audio information and product information to the server.

In this exemplary scenario, a display of the electronic terminal may be configured to display information. When payment needs to be performed, the display may display specified information, for example, "Read the following text: Offline voice payment is very convenient". The microphone may record a reading voice of the user, to form audio information. The electronic terminal may generate a feature matrix according to the audio information, and send the feature matrix to the server.

In this exemplary scenario, after receiving the feature matrix of the audio information and the product information, the server generates a voice feature vector according to the feature matrix, and performs matching between the voice feature vector and a user feature vector in the server, to authenticate an identity of the user. For example, the authentication succeeds, and personal information of the user is obtained according to a user feature vector that successfully matches, to pay, from a financial account in the personal information, for a piece of clothing in the offline site. After the server completes fee deduction for the account of the consumer and the fee enters a financial account of the offline site, successful payment may be notified to the offline site.

Figure 42:
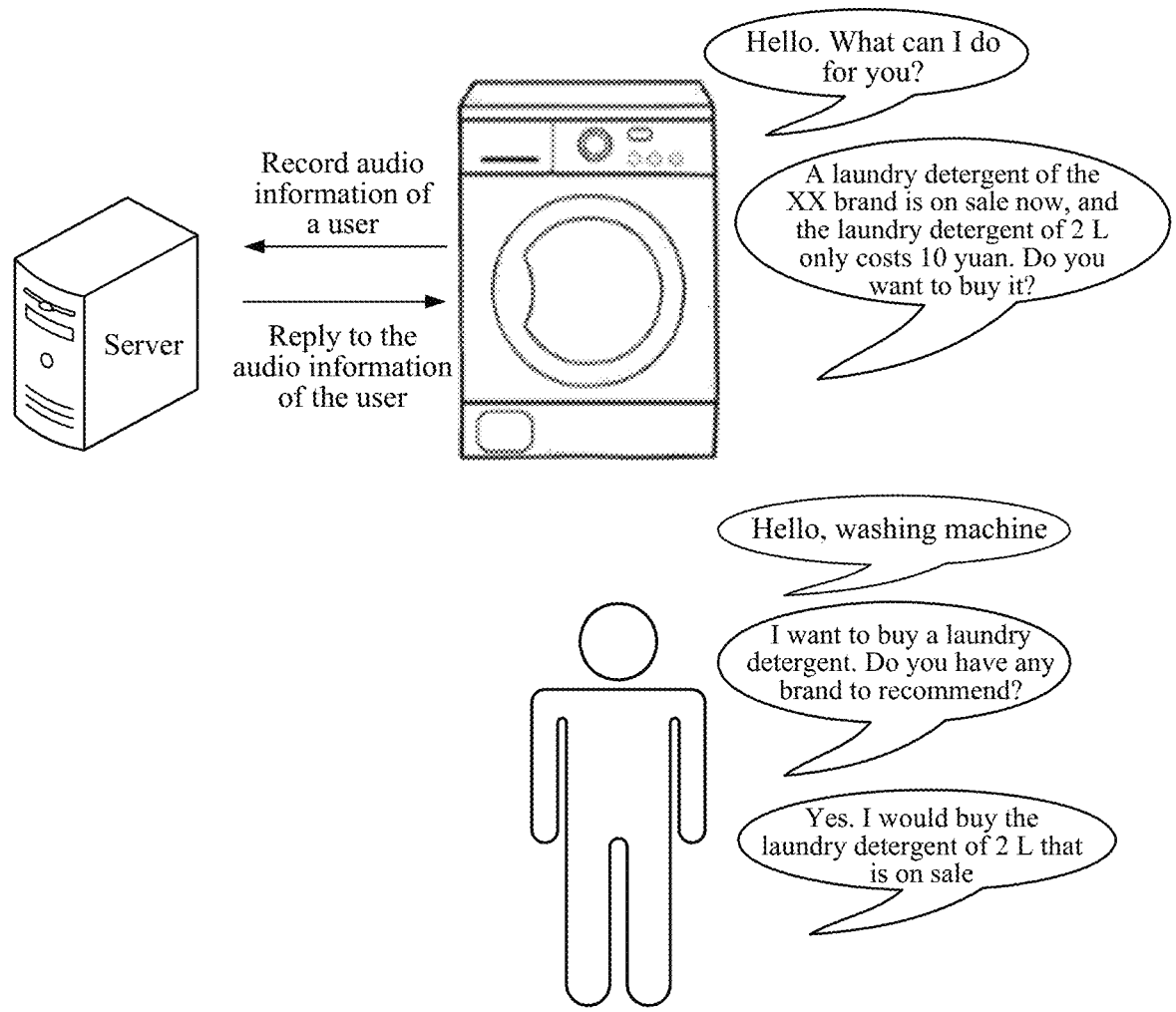
FIG. 42 is a schematic diagram of an application scenario of a payment method according to an embodiment of this application.

Referring to FIG. 42, in an exemplary scenario, the client may be a household Internet of things device having a data acquisition capability. For example, the client may be a device of the category 1 in Table 1. In a household scenario, the client may be manufactured into a washing machine. In addition to having a function required for washing clothes, the washing machine further includes a sensor, a WiFi module, a microphone, a speaker, and the like. The sensor of the washing machine may be a temperature sensor, configured to sense an ambient temperature of the washing machine, or may be a speed sensor, configured to sense a speed of an impeller or a rotary drum of the washing machine. The microphone may record audio data, and the speaker may play audio data provided by the server.

In this exemplary scenario, the microphone records the audio data, is interconnected to a home network by using the WiFi module, and sends the audio data to the server. The server may feedback the audio data to the washing machine, and the audio data is played by using the speaker.

In this exemplary scenario, a laundry detergent is lacked in a household of the user, and needs to be bought. The user may say "Hello, washing machine" to the washing machine. The microphone records the voice into audio information and sends the audio information to the server through WiFi. After receiving the audio information, the server finds a wakeup keyword by means of voice recognition, and sends the audio information to the washing machine; and "Hello. What can I do for you?" is played by using the speaker. The user may say "I want to buy a laundry detergent. Do you have any brand to recommend?". After receiving audio information, the server performs voice recognition and semantic analysis, to obtain a brand to be recommended to the user, and reply, by sending audio information, the user with "A laundry detergent of the XX brand is on sale now, and the laundry detergent of 2 L only costs RMB 10. Do you want to buy it?". The user may reply "Yes. I would buy the laundry detergent of 2 L that is on sale". After receiving audio information, the server performs voice recognition and semantic analysis, to learn that the user agrees to buy the recommended product. A voice feature vector is generated according to an audio file of the user during a dialog with the user, and matching is performed between the voice feature vector and a user feature vector in the server, to authenticate an identity of the user. For example, the authentication succeeds, and personal information of the user is obtained according to a user feature vector that successfully matches, to perform, from a financial account in the personal information, a payment operation on the laundry detergent.

Figure 43:
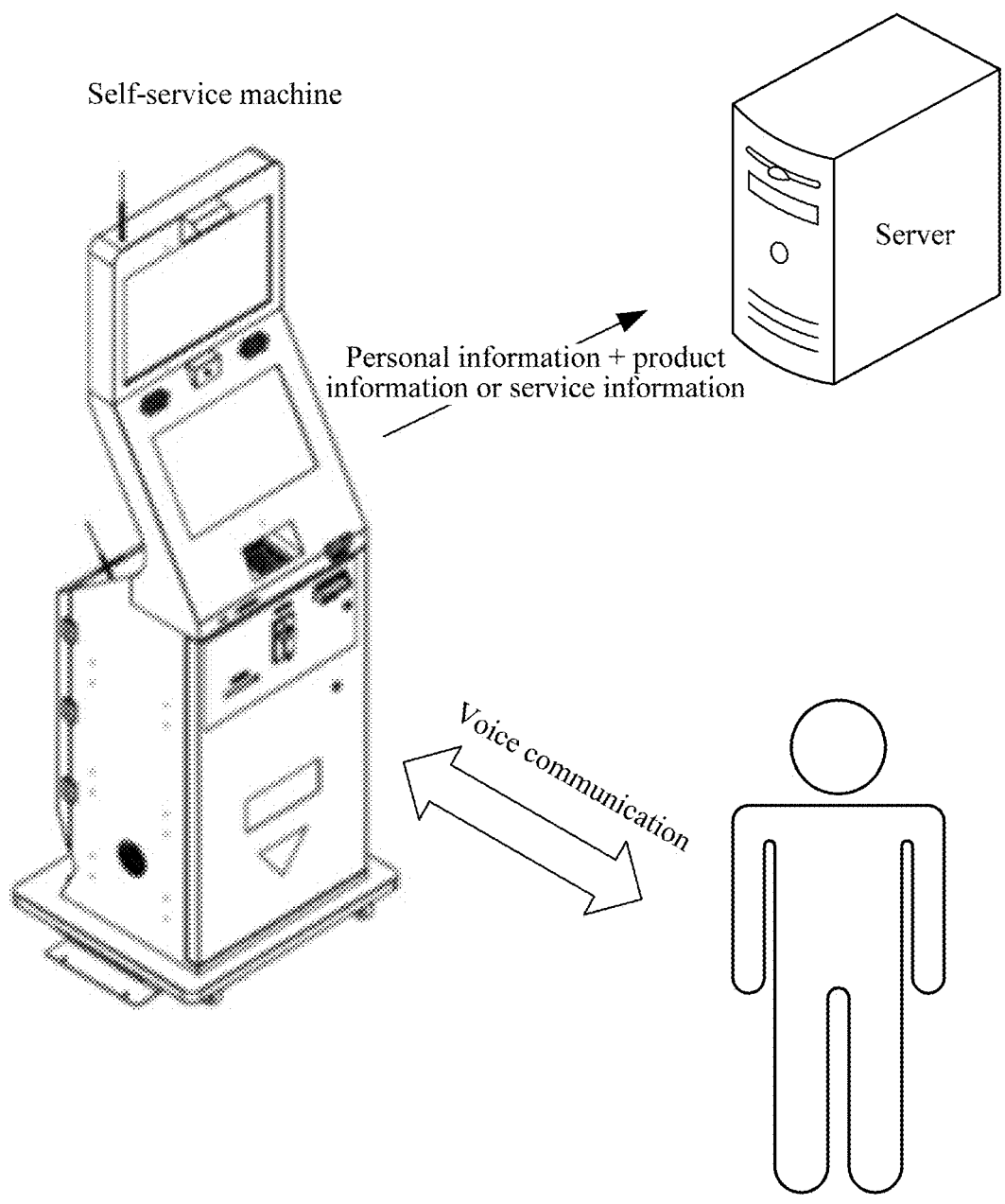
FIG. 43 is a schematic diagram of an application scenario of a payment method according to an embodiment of this application.

Referring to FIG. 43, in an exemplary scenario, the client may be a public service device having a very powerful data processing capability. For example, the client may be a device of the category 5 in Table 1. In a household scenario, the client may be manufactured into a self-service machine.

In this exemplary scenario, the self-service machine may provide a function of paying for utilities or an access fee, a function of subscribing to a newspaper and a magazine, or the like. The user may register with the self-service machine. After the user successfully performs registration, the self-service machine stores a user feature vector of the user and personal information entered by the user, so that when the user performs an operation again, an identity of the user is authenticated according to the user feature vector.

In this exemplary scenario, the user that completes registration operates the self-service machine to subscribe to a newspaper. The user may say "Hello, I want to subscribe to a newspaper" to the self-service machine. The self-service machine records audio information, performs voice recognition and voice analysis, and then determines content expressed by the user; generates a voice feature vector according to the audio information; and performs matching between the voice feature vector and a locally stored user feature vector, to obtain a user feature vector corresponding to the voice feature vector, so as to determine the personal information of the user. The self-service machine may reply "Hello, Mr XX, What's the name of the newspaper that you want to subscribe to?". The user says "I want to subscribe to the Gusu Evening News in the next quarter". The self-service machine replies "You want to subscribe to the Gusu Evening News from July to September. Confirm to pay, and say a payment keyword that is set by you during registration". The user says the payment keyword "Science and technology prompt social progress" that is set during registration.

In this exemplary scenario, the self-service machine further identifies whether the payment keyword is the same as the specified payment keyword. When the payment keyword is the same as the specified payment keyword, the personal information of the user and information about the newspaper subscribed to are sent to the server, so that the server performs, according to a financial account associated with the personal information, a payment operation for a merchant that sells the newspaper.

Figure 5:
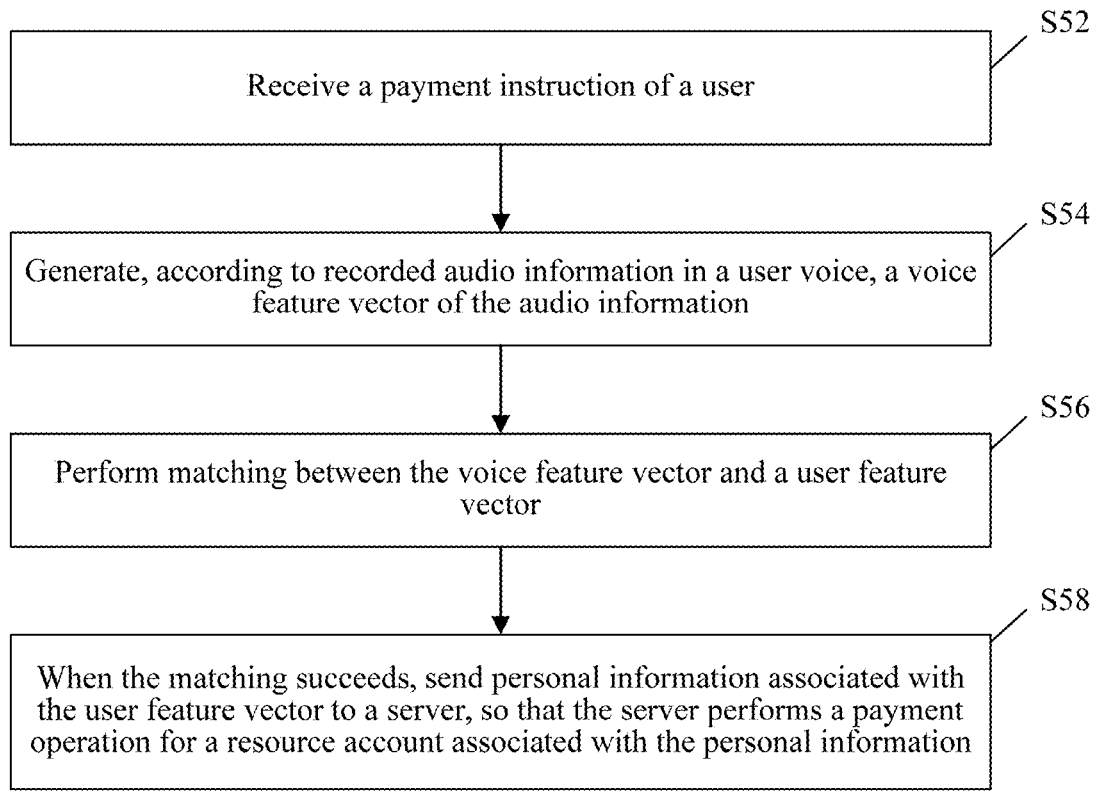
FIG. 5 is a schematic flowchart of a payment method according to an embodiment of this application.

Referring to FIG. 5, an embodiment of this application provides a payment method. The payment method may be applied to a client. The payment method may include the following steps.

Step S52: Receive a payment instruction of a user.

In this embodiment, when the user needs to pay a virtual resource externally from a resource account of the user, the user may send the payment instruction to the client. A manner in which the client receives the payment instruction may include, but is not limited to: identifying a user voice, where the user voice indicates that payment is to be performed, and performing semantic analysis to learn that the user is to perform payment; identifying a user voice, where the user voice includes a specified instruction word, that is, the user may preset an instruction word, and when the user says the instruction word, it indicates that the user needs to perform payment; tapping, by the user, a button in the client that is used to pay for a product or a service; or tapping, by the user, a button in the client that is used to transfer money to another user account.

In this embodiment, the payment instruction may be preset input. When user input received by the client is the preset input, it may be considered that the payment instruction is received. The payment instruction may be that the user is to buy a product or a service, and needs to pay a fee to a merchant. Alternatively, the payment instruction may be that the user is to perform transfer, that is, transfer a virtual resource from the resource account of the user to a resource account of another user, but no purchase event occurs.

Step S54: Generate, according to audio information in a voice input of the user, a voice feature vector of the audio information.

In this embodiment, the voice feature vector is generated according to the audio information. The voice feature vector may be used to determine an identity of the user.

In this embodiment, content expressed in the voice input of the user may be constrained. For example, a text is provided to the user to read by the user. Alternatively, a question is asked to the user and is answered by the user. Certainly, content expressed by the user may be not constrained, and instead, a sentence or a passage said by the user is randomly recorded.

In this embodiment, after receiving an instruction of the user, the client may generate a voice feature vector. Specifically, for example, the user may control the client according to willingness of the user, to learn of product or service information. The user may have a dialog with the client, to learn of detailed parameters or the like of different products or services. Generation of a voice feature vector of the user is enabled only when the user is to perform payment, to authenticate an identity of the user. In a further example, in a scenario in which the client is an intelligent voice box, the user may say "I want to pay" to the intelligent voice box, and the intelligent voice box further generates a voice feature vector of the user only after identifying, by means of voice recognition, content expressed by the user. In a scenario in which the client is a smartphone or a similar electronic device having a screen display function, the user may perform an operation, to indicate to the client that the user is to perform payment. In this case, the client may enable recording of audio information in a user voice, to generate a voice feature vector used to authenticate the identity of the user.

Step S56: Perform matching between the voice feature vector and a user feature vector.

Step S58: When the matching succeeds, send personal information associated with the user feature vector to a server, so that the server performs a payment operation for a resource account associated with the personal information.

In this embodiment, a user feature vector of the user may be preset in the client according to the user registration method. In this way, matching may be performed between the voice feature vector and the user feature vector, to authenticate the identity of the user.

In this embodiment, a manner of performing matching between the voice feature vector and the user feature vector may be performing calculation according to the voice feature vector and the user feature vector, and when there is a relationship between the voice feature vector and the user feature vector, it may be considered that the matching succeeds. Specifically, for example, a difference between the voice feature vector and the user feature vector is obtained and then a sum is obtained, and an obtained value is used as a matching value. The matching value is compared with a specified threshold, and when the matching value is less than or equal to the specified threshold, it is considered that the matching between the voice feature vector and the user feature vector succeeds. Alternatively, a sum of the voice feature vector and the user feature vector may be obtained, and an obtained value is used as a matching value. When the matching value is greater than or equal to a specified threshold, it is considered that the matching between the voice feature vector and the user feature vector succeeds.

In this embodiment, after the client authenticates the identity of the user, the identity of the user is already determined. When the matching succeeds, the client may send the personal information to the server. In this case, the server does not need to perform further identity authentication for the personal information. Certainly, in some cases, the personal information sent by the client to the server may further include a user name and a password of the user, and the server may perform authentication again according to the user name and the password.

In this embodiment, the resource account associated with the personal information may include, but is not limited to, a financial account, a game account, a stock account, a security account, a bonus point account, or the like.

In this embodiment, the payment operation may be a behavior of transferring the ownership of some or all of virtual resources in the resource account. Specifically, for example, in a scenario in which a product is bought, the payment operation may be deducting a particular amount of money from the financial account of the user, to pay for a merchant of the product. In some cases, when a purchase event occurs, the user may first pay a third party, the third party may serve as an intermediary in a secured transaction, and when the user receives a product and informs the third party, the third party transfers money to a merchant.

In this embodiment, a virtual resource may be a resource that is approved to be used between users and that can be available on market and exchangeable. The virtual resource may include, but is not limited to, currency, and in some cases, may be other negotiable securities, a bonus point, or the like.

In this embodiment, the client may be a device of the category 5 in Table 1, or may be a device of the category 4 with relatively excellent hardware configurations and performance.

In this embodiment, matching is performed between a voice feature vector and a user feature vector, to authenticate an identity of a user. In this way, the user may perform identity authentication by using only an audio dialog. Operations of the user are reduced, and use experience of the user is improved. Further, because each user has a respective voice feature, the identity of the user is authenticated by using the voice feature, so that relatively high reliability can be achieved. An identity of a user is authenticated by using a voice, so that hands of the user can be freed; and a requirement for light or the like in an environment is relatively low, so that the technical solution provided in this embodiment adapt to a relatively broad range of scenarios.

In an embodiment, before the obtaining and receiving a payment instruction of a user, the payment method may further include: obtaining by identification an enabling instruction from the audio information in the voice input of the user.

In this embodiment, the client may enable the payment method only after obtaining the enabling instruction of the user. In this way, during normal work and life of the user, interference from the client is prevented. When the user needs to use the client, the user may send the enabling instruction to the client, to start the payment method.

In this embodiment, the client may be in a standby state, and record audio information in a user voice, to identify whether the user sends the enabling instruction to the client. Specifically, for example, the enabling instruction may be identifying that the user says "Hello, XXX". When the client identifies that the user says "Hello, XXX", the payment method is enabled.

In this embodiment, an execution body is not limited to the client, and may be the server. Before determining the object information, the server obtains by identification, from the recorded audio information in the user voice, the enabling instruction. Specifically, for example, the client is only responsible for recording the audio information of the user, and then sends the audio information to the server. The server identifies whether the user sends the enabling instruction.

In this embodiment, the enabling instruction may be user input, and is used to enable the payment method. The enabling instruction may be specified content expressed by the user in words. Certainly, in a scenario in which the client is an intelligent terminal having a display, for example, a smartphone, the enabling instruction may be that the user operates the smartphone and taps a corresponding button, or the like.

In this embodiment, the client may be a device of any one of the category 2 to the category 5 in Table 1, or may be a device of the category 4 with relatively excellent hardware configurations and performance.

In an embodiment, the payment method may further include the following step: obtaining payment object information. Correspondingly, in the step of sending the personal information to the server, when the matching succeeds, the payment object information and the personal information associated with the user feature vector are sent to the server, so that the server performs a payment operation for the payment object information according to the resource account associated with the personal information.

In this embodiment, the payment object information may be used to indicate an object. The payment object information may be an attribute value of the object. Specifically, the payment object information may include a name, a description, a quantity, a field, a composition, and the like of the object. Specifically, for example, the object may be a product or a service. The payment object information may be a product name, a quantity, a price, a product description, a product composition, and the like, or may be a service name, a service type, a price, a time, and the like. In a transfer scenario, the payment object information may include a user name, a resource account name, and the like of a receiver.

In this embodiment, the payment object information obtained by the client may be an object that is identified by the payment object information and that the user pays much attention to. Specifically, for example, the user wants to buy a television, the client may provide television information to the user, for learning and selection by the user. Alternatively, the user needs to pay a virtual resource to another user. Specifically, for example, borrowing occurs between users, or one user pays another user back.

In this embodiment, a manner in which the client obtains the payment object information may include, but is not limited to: recording audio information in a user voice, identifying payment object description information expressed by the user, and then performing matching in a locally stored object information set, to obtain the payment object information; or sending the payment object description information to the server, and receiving the payment object information fed back by the server. Further, after the payment object information is obtained according to a user operation, the payment object information may be displayed by using an interface. Specifically, for example, the client may be an electronic device in which a microphone and a speaker are integrated, for example, an intelligent voice box. The user may have a dialog with the intelligent voice box, to determine, in payment object information provided by the intelligent voice box, a piece of payment object information that is focused on or specified. In addition, the client may be an electronic device similar to a smartphone. The user may operate the smartphone, so that the smartphone displays the payment object information, for example, provides product information or service information or an account name of the user. In addition, in an offline shopping scenario, a salesperson may enter payment object information to the client.

In this embodiment, when the matching succeeds, it indicates that the identity of the user is already authenticated, and the identity of the user is determined. In this way, the virtual resource is paid from the resource account of the user to a resource account corresponding to the payment object information. Specifically, for example, the user wants to buy a product, and after learning of product information by using the intelligent voice box, the user needs to pay a required amount of money to a merchant selling the product. The client first authenticates the identity of the user by using the user voice, and after completing the authentication, pays, from the financial account of the user, the required amount of money to the merchant selling the product.

In this embodiment, the client may be a device of the category 5 in Table 1, or may be a device of the category 4 with relatively excellent hardware configurations and performance.

Figure 6:
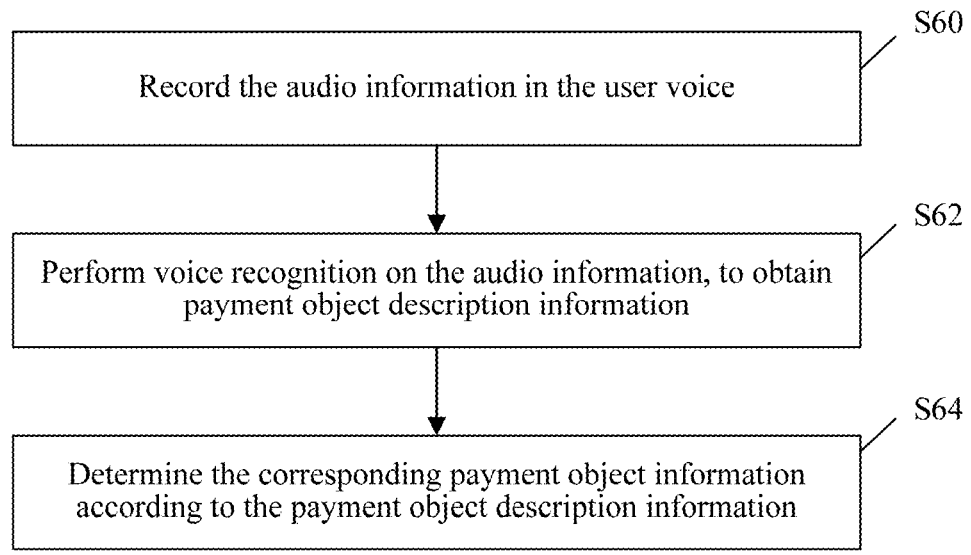
FIG. 6 is a schematic flowchart of a payment method according to an embodiment of this application.

Referring to FIG. 6, in an embodiment, the step of obtaining payment object information may include the following steps:

Step S60: Generate the audio information according to the voice input of the user.

Step S62: Perform voice recognition on the audio information, to obtain payment object description information.

Step S64: Determine the corresponding payment object information according to the payment object description information.

In this embodiment, the user says an object that the user focuses on or wants to learn of. The payment object description information may be content for describing the object by the user. Specifically, for example, the user may say "I want to learn of the Lenovo T450 notebook computer" to the client.

In this embodiment, the client may record the user voice to obtain the audio information, and further may determine, by means of voice recognition, content expressed by the user. Further, the client may determine corresponding payment object information according to the payment object description information expressed by the user. Specifically, for example, after recording the user voice, the client performs voice recognition to obtain that content expressed by the user is that "I want to learn of a Lenovo notebook computer, and a very high price-quality ratio is required". The client may query the object information set for models of Lenovo notebook computers, and may obtain a model with a relatively high price-quality ratio based on comments made by consumers on different models. Certainly, the client may also have a preset evaluation rule to evaluate a price-quality ratio. Further, for example, the Lenovo notebook computer of a model T450 is determined as a model with a relatively high price-quality ratio. In this case, after determining the payment object information, the client may inform the user of the payment object information. Certainly, this embodiment is not limited to that the client queries the local object information set, and may be that the client sends the payment object description information to the server, and the server determines the payment object information, and may feedback the payment object information to the client.

In this embodiment, the client may provide multiple pieces of payment object information to the user to be specified by the user. Specifically, for example, Lenovo notebook computers with a relatively high price-quality ratio provided by the client to the user include: the Lenovo notebook computer T450, the Lenovo notebook computer T440, and the Lenovo notebook computer X260. The user specifies one of the notebook computers for further processing.

In this embodiment, the client may be a device of any one of the category 3 to the category 5 in Table 1.

Figure 7:
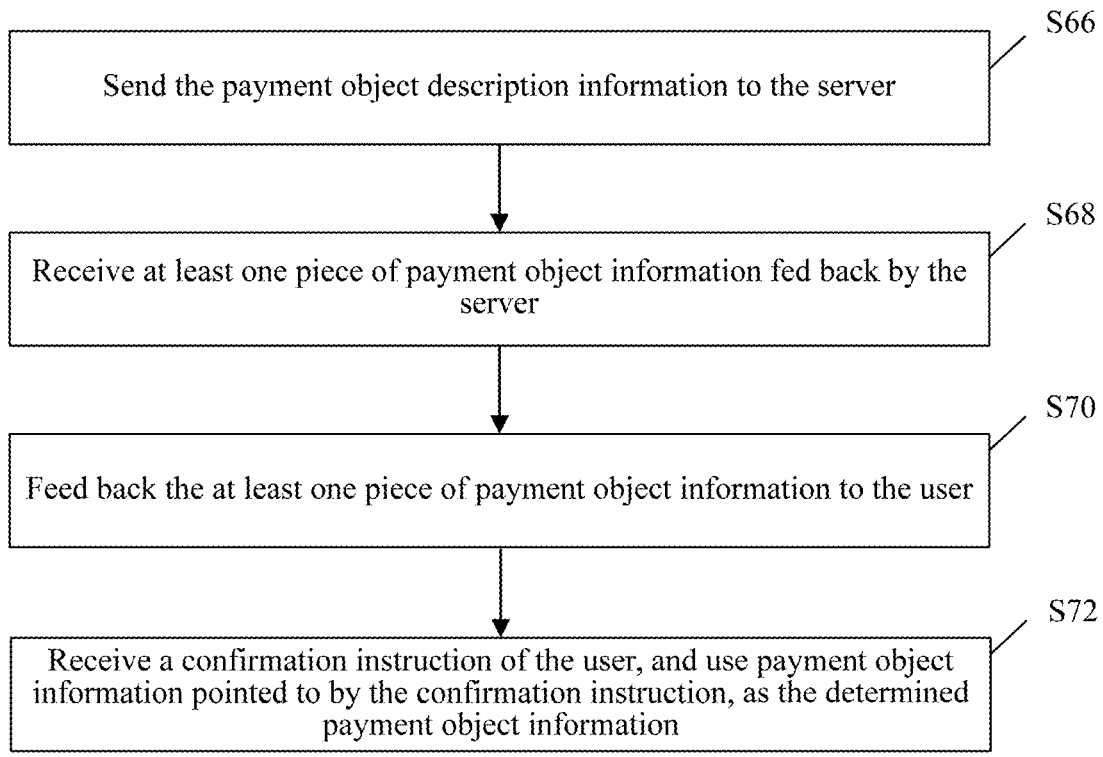
FIG. 7 is a schematic flowchart of a payment method according to an embodiment of this application.

Refer to FIG. 7. In an embodiment, the step of determining the payment object information may include the following steps.

Step S66: Send the payment object description information to the server.

In this embodiment, the client may have no object information set; or the payment object information corresponding to the payment object description information is not found from the object information set of the client. In this case, the client may send the payment object description information to the server.

Step S68: Receive at least one piece of payment object information fed back by the server.

In this embodiment, the server performs querying and matching in the object information set according to the payment object description information, to obtain at least one piece of payment object information. The obtained at least one piece of payment object information may be fed back to the client. Alternatively, one or more pieces of payment object information may be selected from the at least one piece of payment object information according to particular filtering logic and fed back to the client.

Step S70: Feedback the at least one piece of payment object information to the user.

In this embodiment, the client may inform the user of the obtained payment object information by means of voice playing. In a scenario in which the client is an intelligent terminal having a display, the client may display the payment object information to the user by using the display.

Step S72: Receive a confirmation instruction of the user, and use payment object information pointed to by the confirmation instruction, as the determined payment object information.

In this embodiment, after informing the user of the obtained payment object information, and receiving a confirmation instruction of the user, the client determines payment object information on which further processing is performed subsequently.

In this embodiment, the confirmation instruction may be a command used to issue a further processing indication to the client. Specifically, a manner in which the client receives the confirmation instruction of the user may include: recording audio information of a user voice, and obtaining, by means of voice recognition, a confirmation instruction pointed to a piece of payment object information and expressed by the user. Alternatively, in a scenario in which the client includes a display, the user selects a piece of payment object information by operating a button or touching a screen.

In this embodiment, the client may be a device of any one of the category 3 to the category 5 in Table 1.

Figure 8:
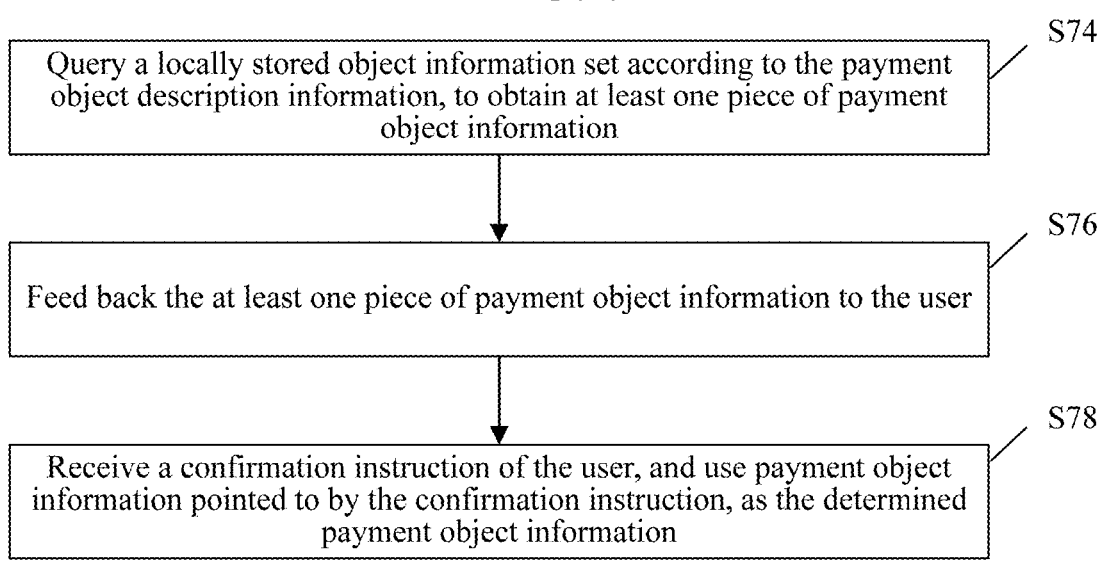
FIG. 8 is a schematic flowchart of a payment method according to an embodiment of this application.

Referring to FIG. 8, in an embodiment, the step of determining the payment object information may include the following steps:

Step S74: Query a locally stored object information set according to the payment object description information, to obtain at least one piece of payment object information.

Step S76: Feedback the at least one piece of payment object information to the user.

Step S78: Receive a confirmation instruction of the user, and use payment object information pointed to by the confirmation instruction, as the determined payment object information.

In this embodiment, matching is performed between the payment object description information and the object information set stored in the client, to further determine the payment object information. When multiple pieces of payment object information are obtained by querying, the multiple pieces of payment object information may be fed back to the user to be specified by the user. For this embodiment, refer to the foregoing embodiments for comparison and explanation.

In this embodiment, the client may be a device of any one of the category 3 to the category 5 in Table 1.

In an embodiment, a manner of generating the voice feature includes at least one of the following: selecting any piece of audio information of the user, to generate the voice feature vector; obtaining audio information that is in the voice input of the user and that includes a user-defined payment keyword, and generating the voice feature vector according to the audio information; or providing specified information to the user, generating audio information according to a voice input that is made by the user based on the specified information, and generating the voice feature vector according to the audio information.

In this embodiment, for different payment scenarios, audio information based on which voice feature vectors are generated may be different. For payment with a small amount of moment, a voice feature vector may be generated according to any piece of recorded audio information in a user voice, to achieve an effect of rapidly performing payment processing. Specifically, a payment amount is less than RMB 100.

In this embodiment, for some relatively large amounts of money, the user may be requested to record audio information with a user-defined payment keyword that is set by the user. The payment keyword may be a preset text or sentence, or simulating a sound without specific meanings. For example, the user may set the birthday of the user as a payment keyword, or learn bird singing as a payment keyword. The payment keyword is used to indicate that the user issues a payment command to the client, that is, when the client receives the payment keyword, it indicates that the user agrees to perform a payment operation. In this way, before payment is performed, matching may be performed between the voice feature vector and the user feature vector, to authenticate the identity, and further, content in the audio information expressed in the user voice may be further obtained by means of voice recognition, to determine whether the user-defined payment keyword predefined by the user is the same as the payment keyword. In this way, two-factor authentication is implemented, and the payment operation is performed only when the authentication succeeds. Specifically, for example, when the payment amount is higher than 100 and less than 300, two-factor authentication is performed.

In this embodiment, for payment with a relatively large amount of money, the specified information may be provided to the user, to request the user to make a sound according to a requirement in the specified information, and audio information is recorded. Specifically, for example, the payment amount is higher than RMB 300, and the specified information may instruct the user to read a text or answer a question. Specifically, for example, a segment of digits may be generated based on a random algorithm or the like, and is provided to the user by playing the segment of digits or displaying the segment of digits on a screen. Alternatively, a question with an answer preset by the user is selected and asked to the user. That the user makes a voice according to the specified information may be that the user reads the text or answers the question according to content in the specified information. The user voice is recorded into audio information. In this way, a voice feature vector can be generated, to authenticate the identity of the user. Before payment is performed, matching may be performed between the voice feature vector and the user feature vector, to authenticate the identity, and further, content in the audio information expressed in the user voice may be further obtained by means of voice recognition, to determine whether the content conforms to the content in the specified information. In this way, two-factor authentication is implemented, and the payment operation is performed only when the authentication succeeds. Further, the specified information is used. A voice to be made by the user is of particular randomicity. Therefore, a case in which the user is masqueraded to perform payment due to malicious recording is prevented to some extent. Certainly, this embodiment of this application is not limited to the combination manner listed above. According to requirements in different scenarios, any combination of the foregoing three manners may be used to perform multifactor authentication.

In this embodiment, the client may be a device of the category 4 or the category 5 in Table 1.

Figure 9:
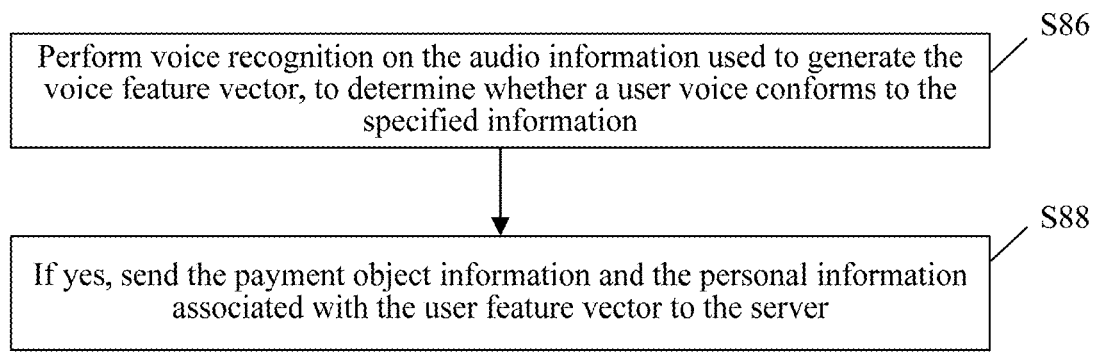
FIG. 9 is a schematic flowchart of a payment method according to an embodiment of this application.

Refer to FIG. 9. In an embodiment, the specified information is requesting the user to make a specified sound. Specifically, for example, the specified information is requesting the user to read a text or answer a question. The specified sound may be a voice of reading the text, or content in the answer. The step of sending the payment object information and personal information associated with the user feature vector to the server may further include the following steps:

Step S86: Perform voice recognition on the audio information used to generate the voice feature vector, to determine whether a user voice conforms to the specified information.

Step S88: If yes, send the payment object information and the personal information associated with the user feature vector to the server.

In this embodiment, two-factor authentication is used before the personal information and the payment object information are sent to the server. The voice feature vector is used to authenticate the identity of the user, to prevent a masquerade. Whether content in the audio information conforms to the content in the specified information is identified, to determine whether the user has an actual intention to pay a virtual resource. When the foregoing two-factor authentication succeeds, the personal information and the payment object information are sent to the server. In this way, security of the resource account of the user is greatly improved.

In this embodiment, that the user voice conforms to the specified information may be that, the content identified from the audio information is consistent with the text in the specified information that is provided to the user to read; or the content identified from the audio information is a correct answer to the question in the specified information that is provided to the user. Specifically, for example, the specified information is requesting the user to read "847579", and content obtained by identifying the audio information of the user is also "847579", so that it is considered that the user voice conforms to the specified information.

In this embodiment, the client may be a device of the category 4 or the category 5 in Table 1.

Figure 10:
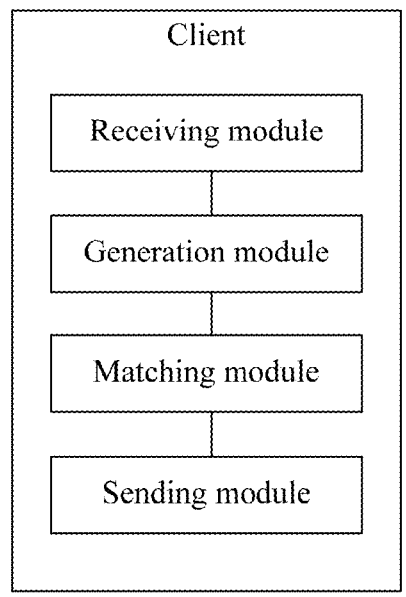
FIG. 10 is a schematic diagram of modules of a client according to an embodiment of this application.

Referring to FIG. 10, an embodiment of this application further provides a client, including a receiving module, a generation module, a matching module, and a sending module.

The receiving module is configured to receive a payment instruction.

The generation module is configured to generate, according to audio information in a voice input of the user, a voice feature vector of the audio information.

The matching module is configured to perform matching between the voice feature vector and a user feature vector.

The sending module is configured to: when the matching succeeds, send personal information associated with the user feature vector to a server, so that the server performs a payment operation for a resource account associated with the personal information.

For a function and an effect that are achieved by the client provided in this embodiment, refer to another embodiment for comparison and explanation.

Figure 11:
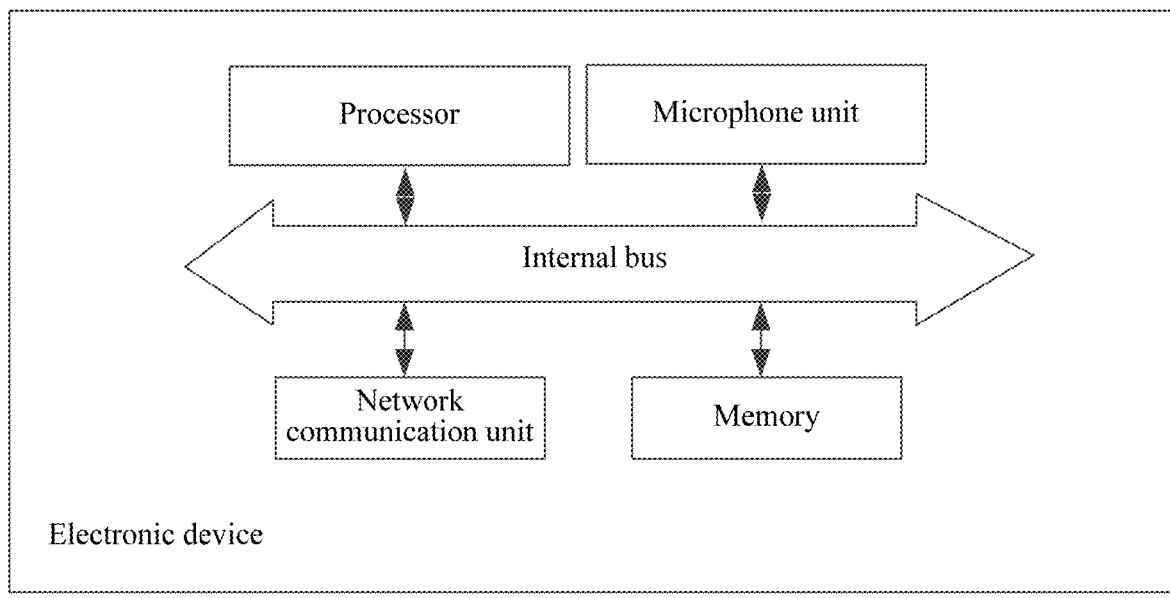
FIG. 11 is a schematic architectural diagram of an electronic device according to an embodiment of this application.

Referring to FIG. 11, an embodiment of this application further provides an electronic device. The client includes a network communication unit, a microphone unit, and a processor.

The network communication unit is configured to send, to a server, personal information provided by the processor, so that the server performs a payment operation for a resource account associated with the personal information.

The microphone unit is configured to generate audio information in a voice input of a user.

The processor is configured to: obtain payment object information; generate a voice feature vector according to the audio information; perform matching between the voice feature vector and a user feature vector; and when the matching succeeds, provide personal information associated with the user feature vector to the network communication unit.

In this embodiment, the memory includes, but is not limited to, a random access memory (RAM), a read-only memory (ROM), a cache, a hard disk drive (HDD), or a memory card. The memory may be configured to store computer program instructions. The network communication unit may be an interface that is set according to a standard specified in a communication protocol, and is configured to perform connection and communication by using a network.

In this embodiment, the processor may be implemented in any proper manner. For example, the processor may use a form such as a microprocessor or a processor and a computer readable medium storing computer readable program code (such as software or firmware) that can be executed by the (micro) processor, a logic gate, a switch, an application-specific integrated circuit (ASIC), a programmable logic controller, or an embedded microcontroller.

In this embodiment, the microphone unit may convert a sound into an electrical signal to form audio information. The microphone unit may use a resistive microphone, an inductive microphone, a capacitive microphone, an aluminum tape microphone, a moving coil microphone, or an electret microphone.

For a function and an effect that are achieved by the client provided in this embodiment, refer to another embodiment for comparison and explanation.

An embodiment of this application further provides a computer storage medium, storing program instructions. When the program instructions is executed by a processor, the following operations are performed: obtaining payment object information; generating, according to audio information in a voice input of the user, a voice feature vector of the audio information; performing matching between the voice feature vector and a user feature vector; and when the matching succeeds, sending the payment object information and personal information associated with the user feature vector to a server, so that the server transfers a virtual resource in a resource account associated with the personal information to a resource account associated with the payment object information.

In this embodiment, the computer storage medium includes, but is not limited to, a RAM, a ROM, a cache, an HDD, or a memory card.

For a function and an effect that are achieved when the program instructions in the computer storage medium provided in this embodiment is executed, refer to another embodiment for comparison and explanation.

Figure 13:
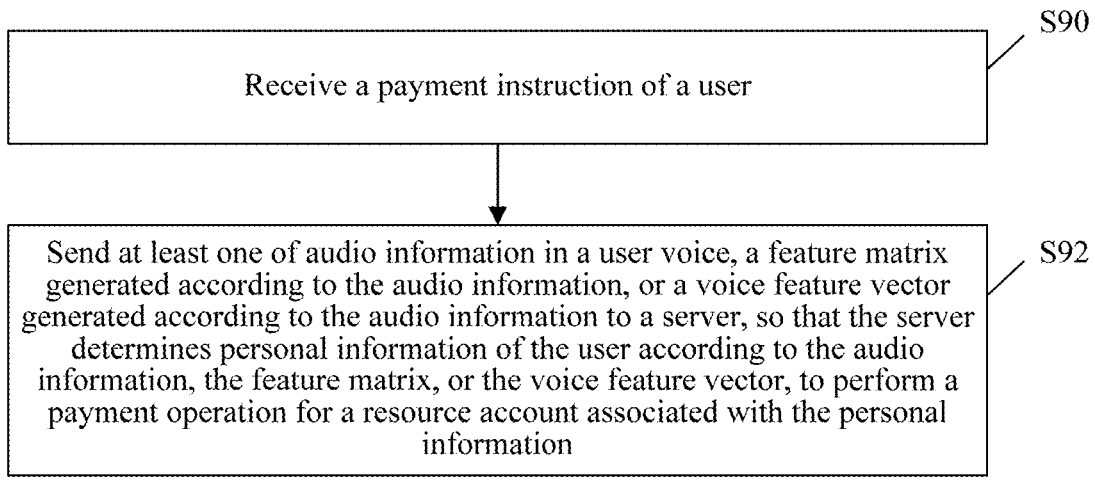
FIG. 13 is a schematic flowchart of a payment method according to an embodiment of this application.

Referring to FIG. 13, an embodiment of this application provides a payment method. The payment method may include the following steps:

Step S90: Receive a payment instruction of a user.

Step S92: Send at least one of audio information in a voice input of the user, a feature matrix generated according to the audio information, or a voice feature vector generated according to the audio information to a server, so that the server determines personal information of the user according to the audio information, the feature matrix, or the voice feature vector, to perform a payment operation for a resource account associated with the personal information.

In this embodiment, a client does not need to identify an identity of the user, and instead the server identifies the identity of the user. In this way, calculation load of the client is reduced. Further, the client does not need to store a user feature vector. This is advantageous to protecting security of a resource account of the user.

In this embodiment, after recording audio information in a user voice, the client may send the audio information to the server. In this way, the server may generate a voice feature vector according to the audio information, and perform matching between the voice feature vector and a user feature vector in the server, to obtain a target feature vector matching the voice feature vector. Personal information associated with the target feature vector is read, to complete identification on the identity of the user. Specifically, for example, the client may be a device of any one of the category 1 to the category 5 in Table 1.

In this embodiment, alternatively, the client may generate a feature matrix according to audio information, and send the generated feature matrix to the server. In this way, after receiving the feature matrix, the server may generate a voice feature vector according to the feature matrix. Further, matching is performed between the voice feature vector and a stored user feature vector. In this way, calculation load of the server can be reduced. In a big data scenario, when many users interact with the server by using the client, after the client generates the feature matrix, a calculation amount of the server can be reduced to some extent. Further, the client sends the generated feature matrix to the server. Because a data amount of the feature matrix is less than that of the audio information, a smaller quantity of network resources are occupied by the feature matrix in a transmission process. Specifically, for example, the client may be a device of any one of the category 2 to the category 5 in Table 1.

In this embodiment, alternatively, the client may generate a voice feature vector according to audio information, and send the generated voice feature vector to the server. In this way, after receiving the voice feature vector, the server may perform matching between the voice feature vector and a stored user feature vector. In this way, calculation load of the server can be reduced. In a big data scenario, when many users interact with the server by using the client, after the client generates the voice feature vector, a calculation amount of the server can be reduced to a great extent. Further, the client sends the generated voice feature vector to the server. Because a data amount of the voice feature vector is far less than that of the audio information, a smaller quantity of network resources are occupied by the voice feature vector in a transmission process. Specifically, for example, the client may be a device of any one of the category 3 to the category 5 in Table 1.

In an embodiment, the method further includes the following step: obtaining payment object information. Correspondingly, in the sending step, the payment object information and at least one of the audio information, the feature matrix, or the voice feature vector are sent to the server, so that the server determines the personal information of the user according to the audio information, the feature matrix, or the voice feature vector, and performs a payment operation for the payment object information according to the resource account associated with the personal information.

In this embodiment, a manner of specifying payment object information is provided in the payment method. For this embodiment, refer to another embodiment for comparison and explanation, and details are not described again.

Figure 14:
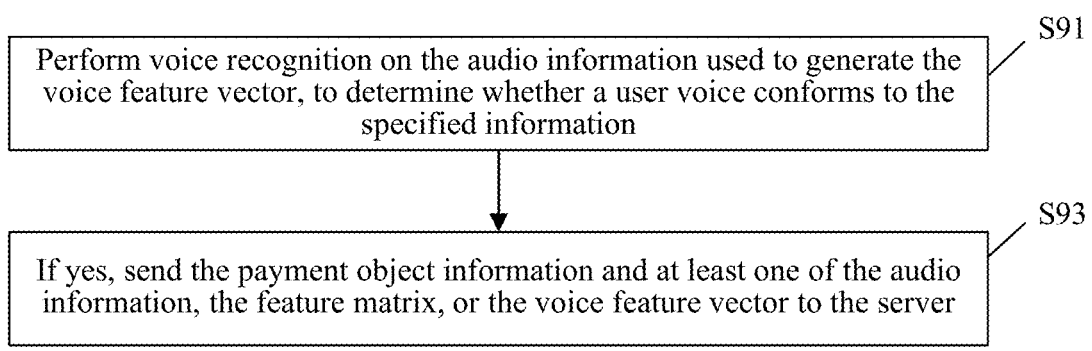
FIG. 14 is a schematic flowchart of a payment method according to an embodiment of this application.

Referring to FIG. 14, in an embodiment, the specified information is requesting the user to make a specified sound. Specifically, for example, the specified information is requesting the user to read a text or answer a question. The specified sound may be a voice of reading the text, or content in the answer. The step of sending at least one of the audio information, the feature matrix, or the voice feature vector to the server may further include the following steps:

Step S91: Perform voice recognition on the audio information used to generate the voice feature vector, to determine whether a user voice conforms to the specified information.

Step S93: If yes, send the payment object information and at least one of the audio information, the feature matrix, or the voice feature vector to the server.

In this embodiment, before the payment object information and the at least one of the audio information, the feature matrix, the voice feature vector are sent to the server, whether content in the audio information conforms to the content in the specified information is identified, to determine whether the user has an actual intention to pay a virtual resource. When the user voice does not conform to the specified information, it may be considered that the user has no actual intention to perform payment. In this way, security of the resource account of the user is improved.

In this embodiment, that the user voice conforms to the specified information may be that, the content identified from the audio information is consistent with a text in the specified information that is provided to the user to read; or the content identified from the audio information is an answer to the question in the specified information that is provided to the user. Specifically, for example, the specified information is requesting the user to read "847579", and content obtained by identifying the audio information of the user is also "847579", so that it is considered that the user voice conforms to the specified information.

In this embodiment, according to different sent content, the client may use a device of a different category in Table 1. When the audio information and the payment object information are sent, the client may use a device of any one of the category 2 to the category 5 in Table 1. When the feature matrix and the payment object information are sent, the client may use a device of any one of the category 2 to the category 5 in Table 1. When the voice feature vector and the payment object information are sent, the client may use a device of the category 4 or the category 5 in Table 1.

Figure 15:
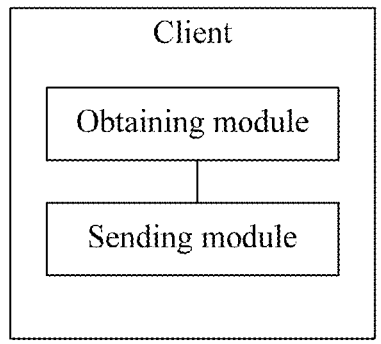
FIG. 15 is a schematic diagram of modules of a client according to an embodiment of this application.

Referring to FIG. 15, an embodiment of this application further provides a client. The client includes a receiving module and a sending module.

The receiving module is configured to receive a payment instruction of a user.

The sending module is configured to send at least one of audio information in a voice input of the user, a feature matrix generated according to the audio information, or a voice feature vector generated according to the audio information to a server, so that the server determines personal information of the user according to the audio information, the feature matrix, or the voice feature vector, to perform a payment operation for a resource account associated with the personal information.

For a function and an effect that are achieved by the client provided in this embodiment, refer to another embodiment for comparison and explanation.

Figure 16:
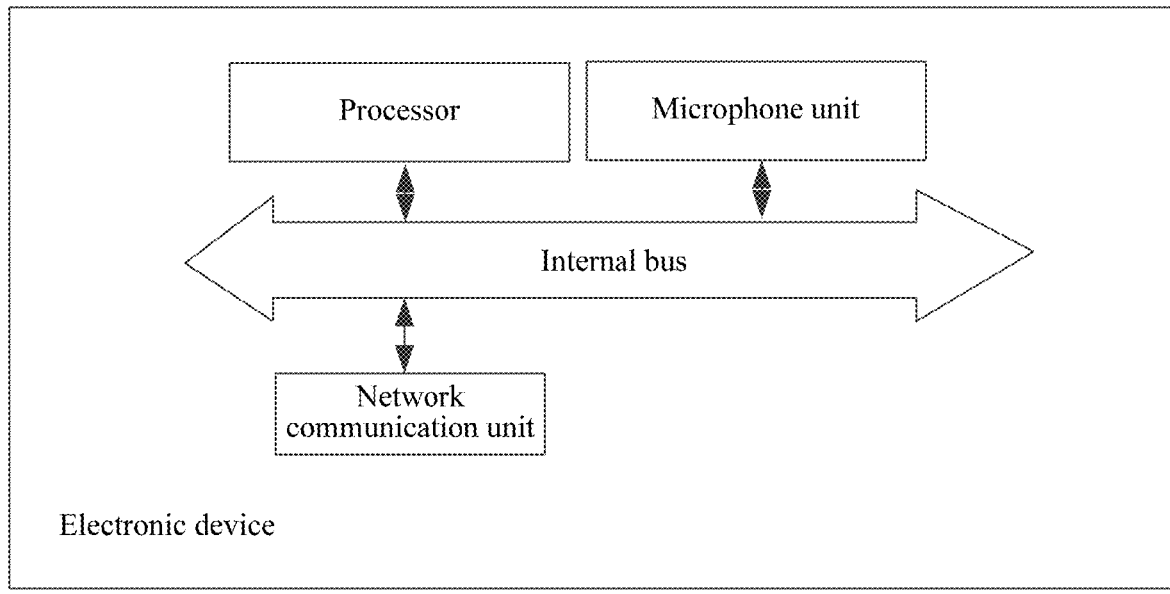
FIG. 16 is a schematic architectural diagram of an electronic device according to an embodiment of this application.

Referring to FIG. 16, an embodiment of this application further provides an electronic device. The electronic device may include a network communication unit, a microphone unit, and a processor.

The network communication unit is configured to send, to a server, a voice feature vector, a feature matrix, or audio information that is provided by the processor, so that the server determines personal information of a user according to the audio information, the feature matrix, or the voice feature vector, to perform a payment operation for a resource account associated with the personal information.

The microphone unit is configured to generate audio information in a voice input of the user.

The processor is configured to obtain payment object information, and can generate the feature matrix or the voice feature vector according to the audio information.

In this embodiment, the memory includes, but is not limited to, a RAM, a ROM, a cache, an HDD, or a memory card. The memory may be configured to store computer program instructions. The network communication unit may be an interface that is set according to a standard specified in a communication protocol, and is configured to perform connection and communication by using a network.

In this embodiment, the processor may be implemented in any proper manner.

For example, the processor may use a form such as a microprocessor or a processor and a computer readable medium storing computer readable program code (such as software or firmware) that can be executed by the (micro) processor, a logic gate, a switch, an ASIC, a programmable logic controller, or an embedded microcontroller.

In this embodiment, the microphone unit may convert a sound into an electrical signal to form audio information. The microphone unit may use a resistive microphone, an inductive microphone, a capacitive microphone, an aluminum tape microphone, a moving coil microphone, or an electret microphone.

An embodiment of this application further provides a computer storage medium. The computer storage medium stores computer program instructions, and when the computer program instructions are executed by a processor, the following operations are performed: receiving a payment instruction of a user; and sending at least one of audio information in a voice input of the user, a feature matrix generated according to the audio information, or a voice feature vector generated according to the audio information to a server, so that the server determines personal information of the user according to the audio information, the feature matrix, or the voice feature vector, to perform a payment operation for a resource account associated with the personal information.

In this embodiment, the computer storage medium includes, but is not limited to, a RAM, a ROM, a cache, an HDD, or a memory card.

For a function and an effect that are achieved when the computer program instructions in the computer storage medium provided in this embodiment are executed, refer to another embodiment for comparison and explanation.

Figure 17:
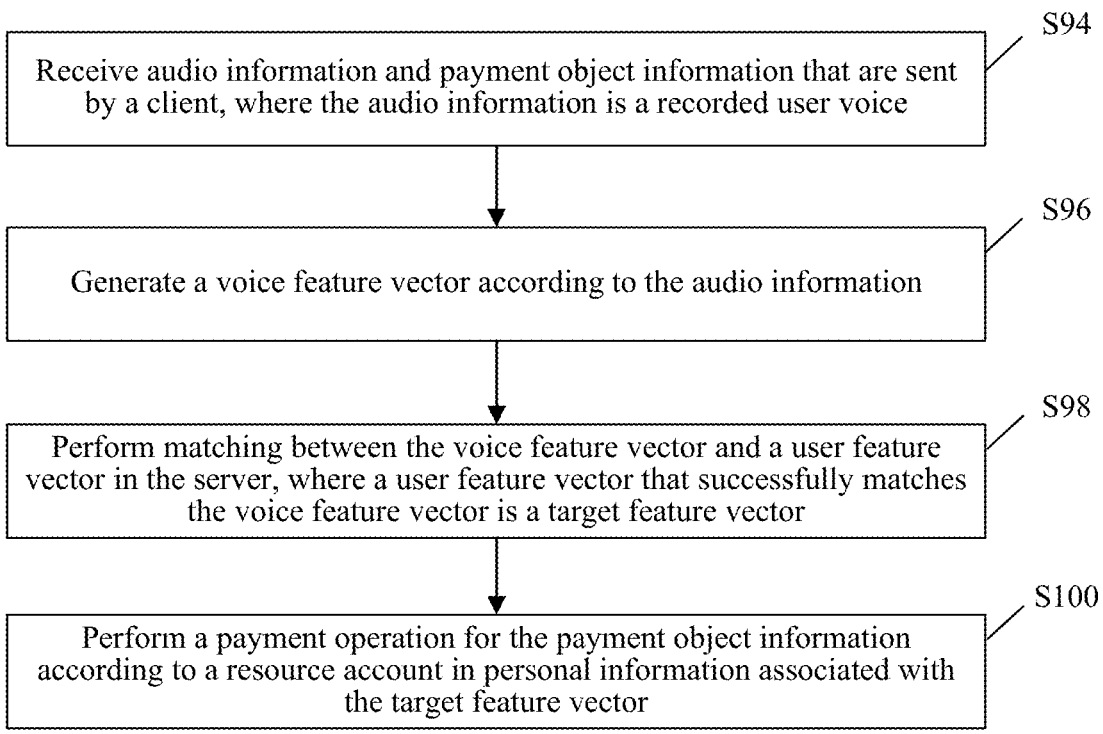
FIG. 17 is a schematic flowchart of a payment method according to an embodiment of this application.

Referring to FIG. 17, an embodiment of this application provides a payment method, applied to a server. The method may include the following steps.

Step S94: Receive audio information and payment object information that are sent by a client, where the audio information is generated according to a voice input of a user.

In this embodiment, the server is not limited to receiving the audio information and the payment object information at the same time. Specifically, for example, the client may first send the audio information, and then send the payment object information, and vice versa.

In this embodiment,

Step S96: Generate a voice feature vector according to the audio information.

Step S98: Perform matching between the voice feature vector and a user feature vector in the server, where a user feature vector that successfully matches the voice feature vector is a target feature vector.

Step S100: Perform a payment operation for the payment object information according to a resource account in personal information associated with the target feature vector.

In this embodiment, the server may communicate with the client based on a network communication protocol. The network communication protocol includes, but is not limited to, the HTTP, the TCP/IP, the FTP, or the like.

In this embodiment, the server may generate the voice feature vector according to the audio information provided by the client, and then may perform matching with the user feature vector in the server, to determine an identity of the user.

In this embodiment, the server may have multiple user feature vectors. The user may perform registration by operating the client. After the user performs registration, the user feature vector of the user is associated with the personal information. The server may be configured to store the user feature vector and the personal information after the user performs registration.

In this embodiment, the server uniformly performs identity authentication, so that the client may perform an operation without sensitive information. In this way, security of the resource account of the user can be improved.

Figure 18:
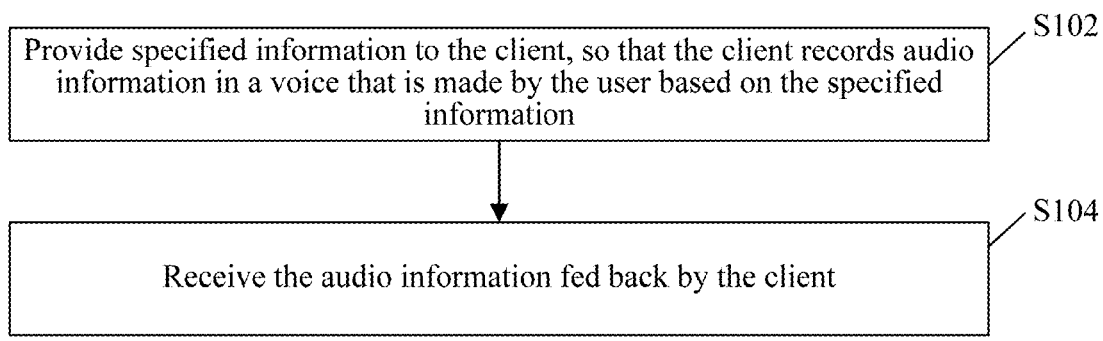
FIG. 18 is a schematic flowchart of a payment method according to an embodiment of this application.

Referring to FIG. 18, in an embodiment, the step of receiving audio information may include the following steps.

Step S102: Provide specified information to the client, so that the client generates audio information according to a voice input that is made by the user based on the specified information.

In this embodiment, the specified information may instruct the user to read a text or answer a question. Specifically, for example, a segment of digits may be generated based on a random algorithm or the like, and is provided to the user by playing the segment of digits or displaying the segment of digits on a screen. Alternatively, a question with an answer preset by the user is selected and asked to the user. In this embodiment, the server generates the specified information and then sends the specified information to the client.

In this embodiment, that the user makes a voice according to the specified information may be that the user reads the text or answers the question according to content in the specified information. The user voice is recorded into audio information. In this way, a voice feature vector can be generated, to authenticate the identity of the user.

Step S104: Receive the audio information fed back by the client.

In this embodiment, the user voice may be constrained by using the specified information, thereby achieving a particular regulation function for the generated voice feature vector. In this way, it helps improve accuracy of determining whether the voice feature vector matches the user feature vector, that is, improve accuracy of authenticating the identity of the user.

Figure 19:
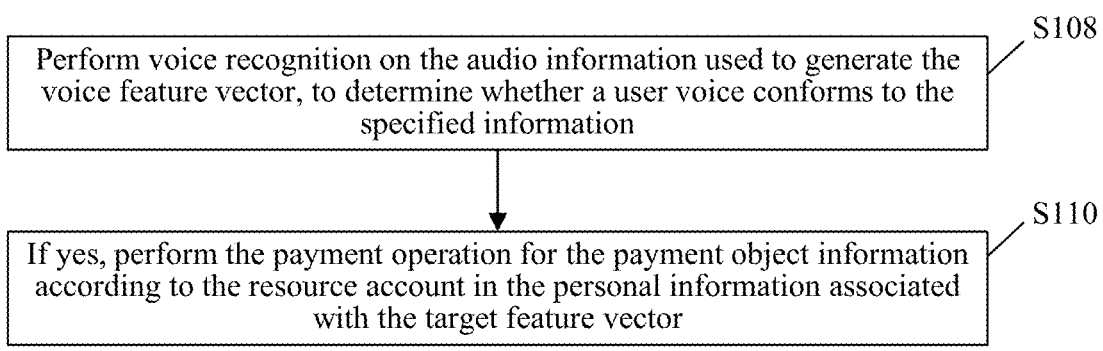
FIG. 19 is a schematic flowchart of a payment method according to an embodiment of this application.

Referring to FIG. 19, in an embodiment, the specified information is requesting the user to make a specified sound. Specifically, for example, the specified information is requesting the user to read a text or answer a question. The specified sound may be a voice of reading the text, or content in the answer. The step of performing a payment operation may further include the following steps:

Step S108: Perform voice recognition on the audio information used to generate the voice feature vector, to determine whether a user voice conforms to the specified information.

Step S110: If yes, perform the payment operation for the payment object information according to the resource account in the personal information associated with the target feature vector.

In this embodiment, the server uses two-factor authentication before performing the payment operation. The identity of the user is authenticated by using the voice feature vector, and whether content in the audio information conforms to the content in the specified information is identified. The server performs the payment operation only when the foregoing two-factor authentication succeeds. In this way, security of the resource account of the user is improved.

In this embodiment, that the user voice conforms to the specified information may be that, the content identified from the audio information is consistent with a text in the specified information that is provided to the user to read; or the content identified from the audio information is an answer to the question in the specified information that is provided to the user. Specifically, for example, the specified information is requesting the user to read "847579", and content obtained by identifying the audio information of the user is also "847579", so that it is considered that the user voice conforms to the specified information.

Figure 20:
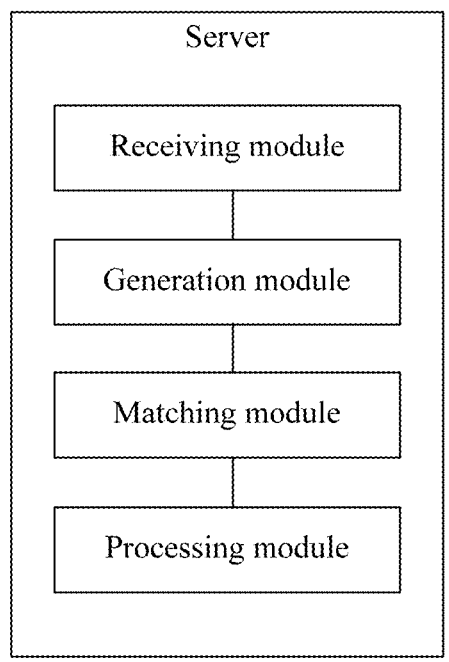
FIG. 20 is a schematic diagram of modules of a server according to an embodiment of this application.

Referring to FIG. 20, an embodiment of this application provides a server, including a receiving module, a generation module, a matching module, and a processing module.

The receiving module is configured to receive audio information and payment object information that are sent by a client, where the audio information is generated according to a voice input of a user.

The generation module is configured to generate a voice feature vector according to the audio information.

The matching module is configured to perform matching between the voice feature vector and a user feature vector in the server, where a user feature vector that successfully matches the voice feature vector is a target feature vector.

The processing module is configured to perform a payment operation for the payment object information according to a resource account in personal information associated with the target feature vector.

For a function and an effect that are achieved by the server provided in this embodiment, refer to another embodiment for comparison and explanation.

Figure 21:
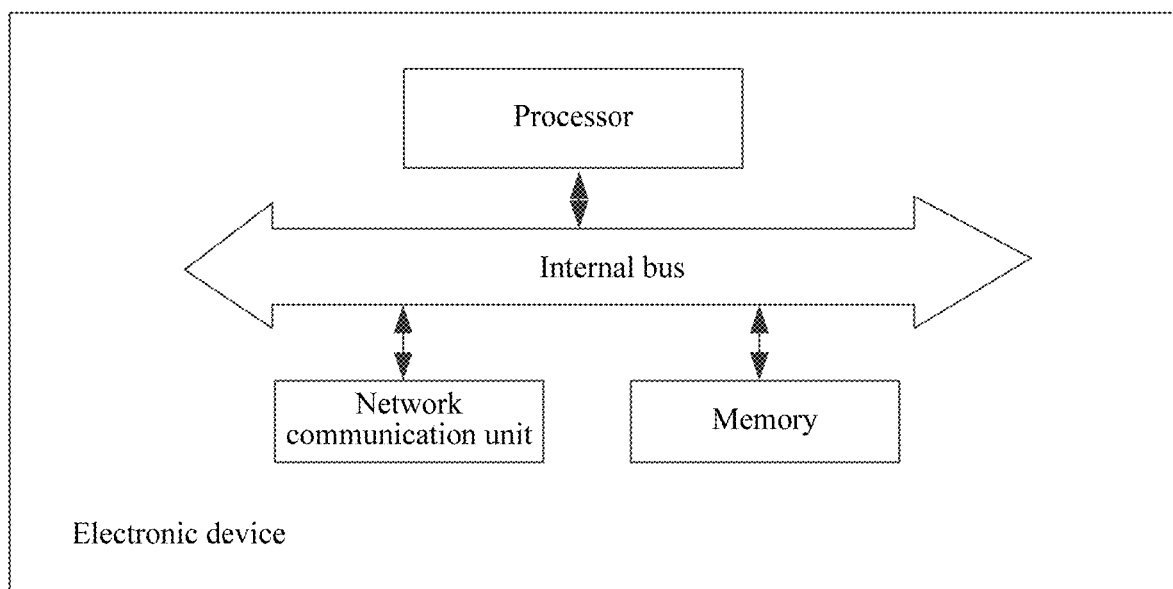
FIG. 21 is a schematic architectural diagram of an electronic device according to an embodiment of this application.

Referring to FIG. 21, an embodiment of this application provides an electronic device. The electronic device may include a network communication unit, a memory, and a processor.

The network communication unit is configured to receive audio information and payment object information that are sent by a client, where the audio information is generated according to a voice input of a user.

The memory is configured to store a user feature vector, where the user feature vector is associated with personal information.

The processor is configured to: generate a voice feature vector according to the audio information; perform matching between the voice feature vector and the user feature vector in the memory, where a user feature vector that successfully matches the voice feature vector is a target feature vector; and perform a payment operation for the payment object information according to a resource account in personal information associated with the target feature vector.

In this embodiment, the memory includes, but is not limited to, a RAM, a ROM, a cache, an HDD, or a memory card. The memory may be configured to store computer program instructions. The network communication unit may be an interface that is set according to a standard specified in a communication protocol, and is configured to perform connection and communication by using a network.

In this embodiment, the processor may be implemented in any proper manner. For example, the processor may use a form such as a microprocessor or a processor and a computer readable medium storing computer readable program code (such as software or firmware) that can be executed by the (micro) processor, a logic gate, a switch, an ASIC, a programmable logic controller, or an embedded microcontroller.

For a function and an effect that are achieved by the electronic device provided in this embodiment, refer to another embodiment for comparison and explanation.

An embodiment of this application further provides a computer storage medium. The computer storage medium stores computer program instructions, and when the computer program instructions are executed by a processor, the following operations are performed: receiving audio information and payment object information that are sent by a client, where the audio information is generated according to a voice input of a user; generating a voice feature vector according to the audio information; performing matching between the voice feature vector and a user feature vector, where a user feature vector that successfully matches the voice feature vector is a target feature vector; and performing a payment operation for the payment object information according to a resource account in personal information associated with the target feature vector.

In this embodiment, the computer storage medium includes, but is not limited to, a RAM, a ROM, a cache, an HDD, or a memory card.

For a function and an effect that are achieved when the computer program instructions in the computer storage medium provided in this embodiment are executed, refer to another embodiment for comparison and explanation.

Figure 22:
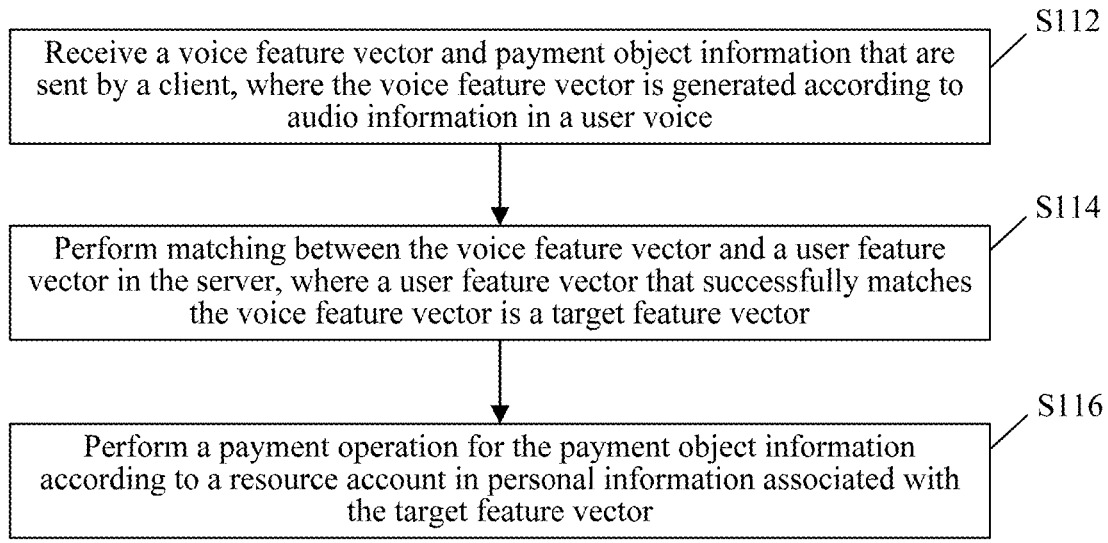
FIG. 22 is a schematic flowchart of a payment method according to an embodiment of this application.

Referring to FIG. 22, an embodiment of this application further provides a payment method. The payment method is applied to a server. The method may include the following steps:

Step S112: Receive a voice feature vector and payment object information that are sent by a client, where the voice feature vector is generated according to audio information in a user voice.

Step S114: Perform matching between the voice feature vector and a user feature vector in the server, where a user feature vector that successfully matches the voice feature vector is a target feature vector.

Step S116: Perform a payment operation for the payment object information according to a resource account in personal information associated with the target feature vector.

In this embodiment, the server directly receives the voice feature vector sent by the client, so that the server may directly perform matching between the voice feature vector and the user feature vector. The server does not need to the server generate the voice feature vector according to the audio information. In this way, calculation load of the server can be reduced. n a big data scenario, when many users interact with the server by using the client, after the client generates the voice feature vector, a calculation amount of the server can be reduced to a great extent. Further, the client sends the generated voice feature vector to the server. Because a data amount of the voice feature vector is less than that of the audio information, a smaller quantity of network resources are occupied by the voice feature vector in a transmission process.

Figure 23:
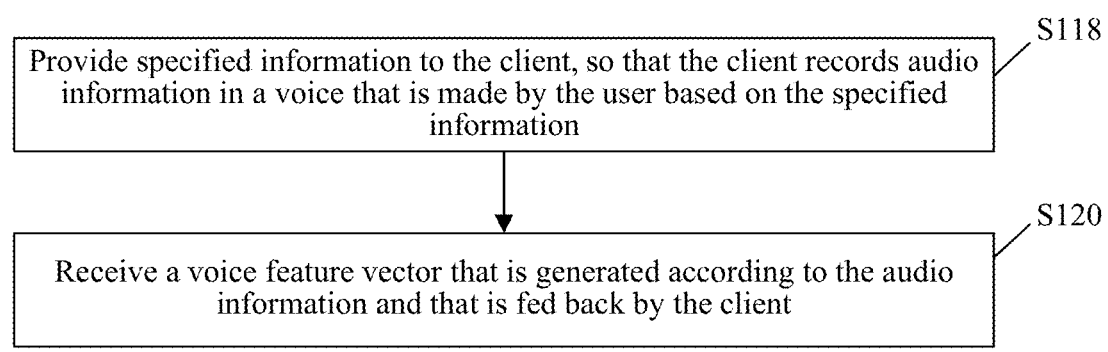
FIG. 23 is a schematic flowchart of a payment method according to an embodiment of this application.

Referring to FIG. 23, in an embodiment, the step of receiving a voice feature vector may include the following steps:

Step S118: Provide specified information to the client, so that the client records audio information in a voice that is made by the user based on the specified information.

Step S120: Receive a voice feature vector that is generated according to the audio information and that is fed back by the client.

In this embodiment, the server may send the specified information to the client, to constrain content in the audio information provided by the client. In this way, the audio information provided by the client is regulated, so that it is more convenient for the server to generate the voice feature vector, and improve accuracy of performing matching between the voice feature vector and the user feature vector.

Figure 24:
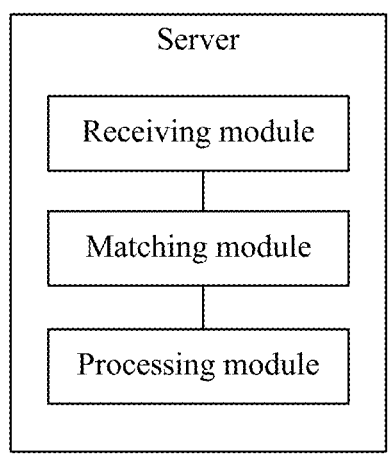
FIG. 24 is a schematic diagram of modules of a server according to an embodiment of this application.

Referring to FIG. 24, an embodiment of this application provides a server. The server includes a receiving module, a matching module, and a processing module.

The receiving module is configured to receive a voice feature vector and payment object information that are sent by a client, where the voice feature vector is generated according to audio information in a voice input of a user.

The matching module is configured to perform matching between the voice feature vector and a user feature vector in the server, where a user feature vector that successfully matches the voice feature vector is a target feature vector.

The processing module is configured to perform a payment operation for the payment object information according to a resource account in personal information associated with the target feature vector.

For a function and an effect that are achieved by the server provided in this embodiment, refer to another embodiment for comparison and explanation.

Figure 25:
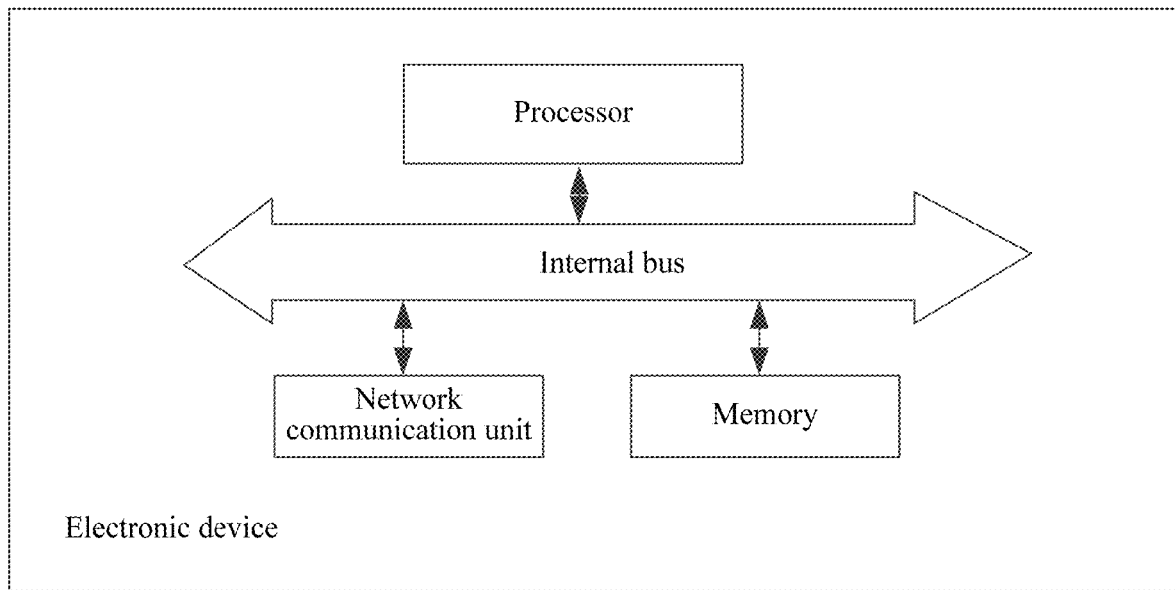
FIG. 25 is a schematic architectural diagram of an electronic device according to an embodiment of this application.

Referring to FIG. 25, an embodiment of this application further provides an electronic device. The electronic device may include a network communication unit, a memory, and a processor.

The network communication unit is configured to receive a voice feature vector and payment object information that are sent by a client, where the voice feature vector is generated according to audio information in a voice input of a user.

The memory is configured to store a user feature vector, where the user feature vector is associated with personal information.

The processor is configured to: perform matching between the voice feature vector and the user feature vector in the memory, where a user feature vector that successfully matches the voice feature vector is a target feature vector; and perform a payment operation for the payment object information according to a resource account in personal information associated with the target feature vector.

In this embodiment, the memory includes, but is not limited to, a RAM, a ROM, a cache, an HDD, or a memory card. The memory may be configured to store computer program instructions. The network communication unit may be an interface that is set according to a standard specified in a communication protocol, and is configured to perform connection and communication by using a network.

In this embodiment, the processor may be implemented in any proper manner. For example, the processor may use a form such as a microprocessor or a processor and a computer readable medium storing computer readable program code (such as software or firmware) that can be executed by the (micro) processor, a logic gate, a switch, an ASIC, a programmable logic controller, or an embedded microcontroller.

For a function and an effect that are achieved by the electronic device provided in this embodiment, refer to another embodiment for comparison and explanation.

An embodiment of this application further provides a computer storage medium. The computer storage medium stores computer program instructions, and when the computer program instructions are executed by a processor, the following operations are performed: receiving a voice feature vector and payment object information that are sent by a client, where the voice feature vector is generated according to audio information in a user voice; performing matching between the voice feature vector and a user feature vector, where a user feature vector that successfully matches the voice feature vector is a target feature vector; and performing a payment operation for the payment object information according to a resource account in personal information associated with the target feature vector.

For a function and an effect that are achieved when the computer program instructions in the computer storage medium provided in this embodiment are executed, refer to another embodiment for comparison and explanation.

Figure 26:
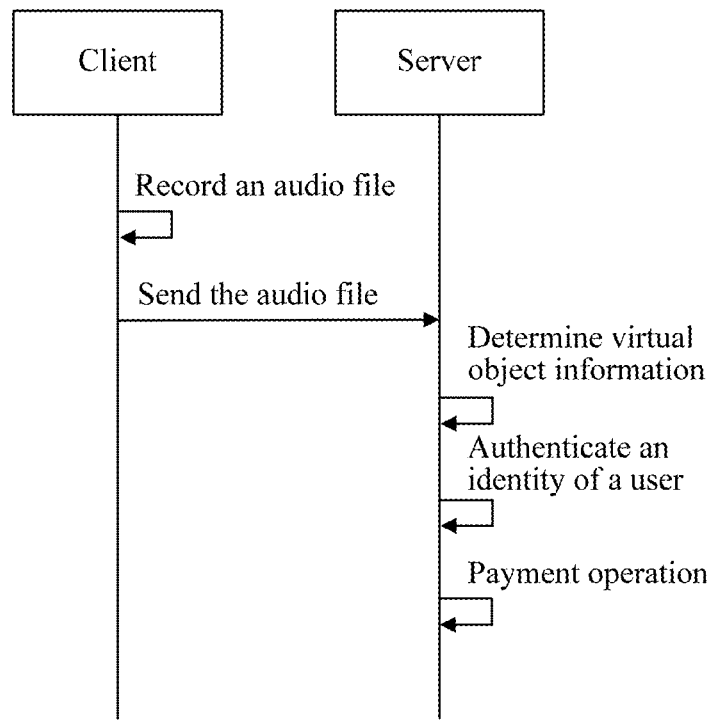
FIG. 26 is a schematic flowchart of a payment method according to an embodiment of this application.
Figure 27:
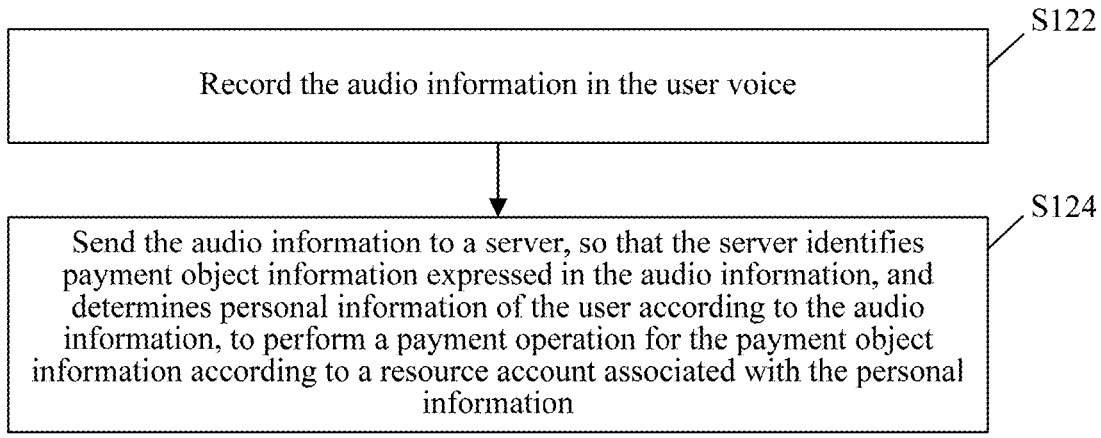
FIG. 27 is a schematic flowchart of a payment method according to an embodiment of this application.

Referring to FIG. 26 and FIG. 27, an embodiment of this application further provides a payment method. The method may include the following steps:

Step S122: Generate the audio information according to the voice input of the user.

Step S124: Send the audio information to a server, so that the server identifies payment object information expressed in the audio information, and determines personal information of the user according to the audio information, to perform a payment operation for the payment object information according to a resource account associated with the personal information.

In this embodiment, the client may be only responsible for recording the audio information, and send the recorded audio information to the server. In this way, a function of the client is relatively simple and is convenient to achieve. The server mainly completes a data processing function and the like. This is convenient to manage and maintain. In some cases, when logic for main data processing is updated, program instructions in the server may be updated. This is convenient to manage software.

In this embodiment, the electronic device may be a device of any category in Table 1.

Figure 28:
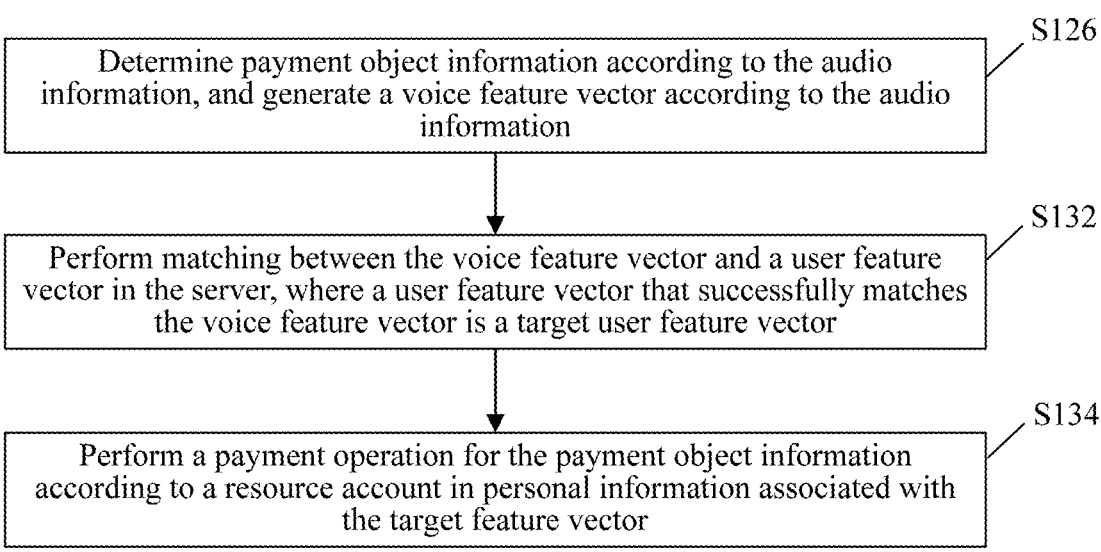
FIG. 28 is a schematic flowchart of a payment method according to an embodiment of this application.

Referring to both FIG. 26 and FIG. 28, an embodiment of this application further provides a payment method. The method is applied to a server. The server receives audio information provided by a client, where the audio information is generated according to a voice input of a user. The payment method may include the following steps.

Step S126: Determine payment object information according to the audio information, and generate a voice feature vector according to the audio information.

In this embodiment, the server may perform voice recognition on the audio information, to identify payment object description information expressed by the user, and further obtains the payment object information by performing matching in a locally stored object information set.

Step S132: Perform matching between the voice feature vector and a user feature vector in the server, where a user feature vector that successfully matches the voice feature vector is a target user feature vector.

Step S134: Perform a payment operation for the payment object information according to a resource account in personal information associated with the target feature vector.

In this embodiment, there may be one or more pieces of audio information. The client may generate a piece of audio information after performing recording for particular duration, or may generate a piece of audio information after a particular data mount in recording is reached. The client may further have a voice recognition function, and generates audio information after the user finishes a sentence. Alternatively, when the user has an apparent pause in speaking, continuously recorded audio data is used as a piece of audio information.

In this embodiment, the server completes main calculation processing in the payment method. In this way, the client may only record a user voice to generate audio information, and send the audio information to the server, thereby simplifying service logic of the client. Further, the server uniformly manages main calculation logic. This is convenient to perform upgrade and maintenance. Further, except providing the audio information, basically, the client does not participate in other interaction. In this way, data processing in the server may be performed in a relatively enclosed calculation environment, thereby reducing a risk of leaking the personal information of the user and improving security of an entire system.

Figure 29:
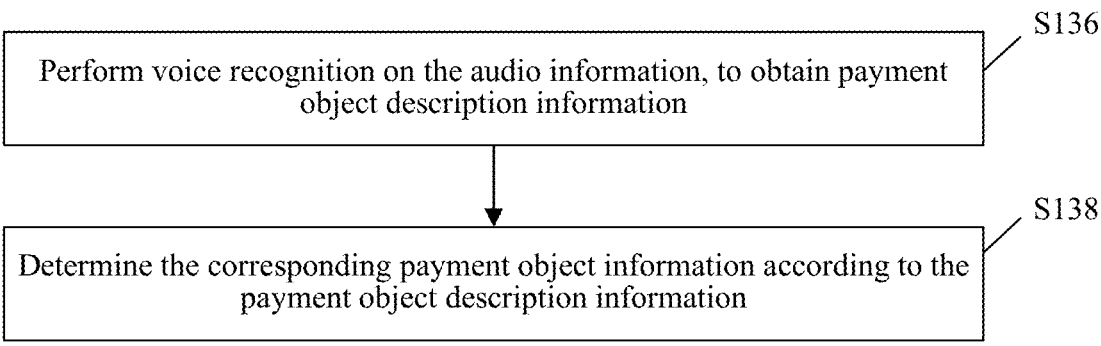
FIG. 29 is a schematic flowchart of a payment method according to an embodiment of this application.

Referring to FIG. 29, in an embodiment, the step of determining the payment object information may include the following steps:

Step S136: Perform voice recognition on the audio information, to obtain payment object description information.

Step S138: Determine the corresponding payment object information according to the payment object description information.

In this embodiment, the server may determine, by means of voice recognition, content expressed by the user. Further, the server may determine corresponding payment object information according to the payment object description information expressed by the user. Specifically, for example, the server performs voice recognition on the audio information to obtain that content expressed by the user is that "I want to learn of a Lenovo notebook computer, and a very high price-quality ratio is required". The server may query the object information set for models of Lenovo notebook computers, and may obtain a model with a relatively high price-quality ratio based on comments made by consumers on different models. Certainly, the client may also have a preset evaluation rule to evaluate a price-quality ratio. Further, for example, the Lenovo notebook computer of a model T450 is determined as a model with a relatively high price-quality ratio. In this case, after determining the payment object information, the server may send the payment object information to the client to inform the user.

Figure 30:
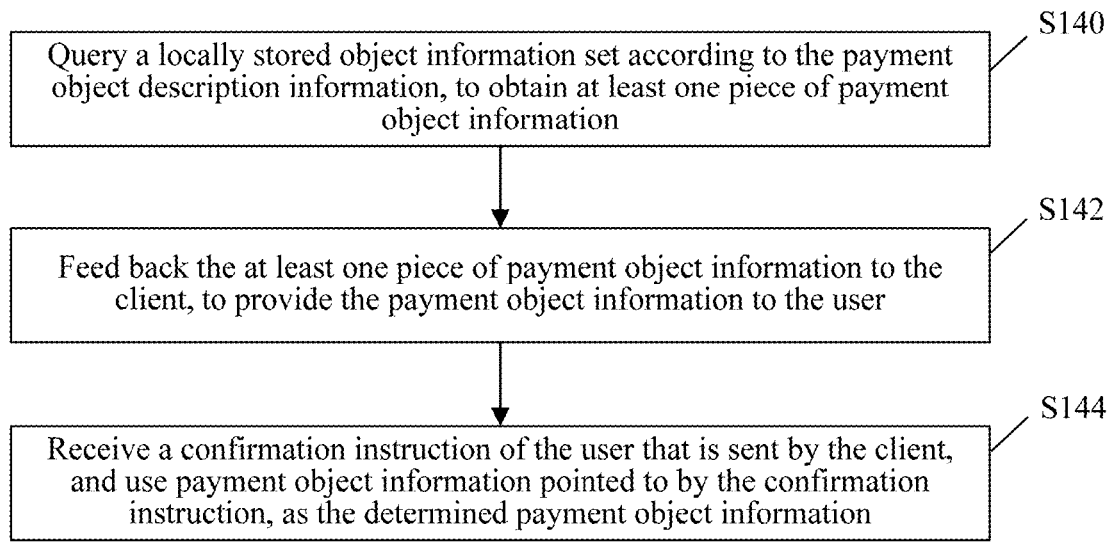
FIG. 30 is a schematic flowchart of a payment method according to an embodiment of this application.

Referring to FIG. 30, in an embodiment, the step of determining the payment object information may include the following steps:

Step S140: Query a locally stored object information set according to the payment object description information, to obtain at least one piece of payment object information.

Step S142: Feedback the at least one piece of payment object information to the client, to provide the payment object information to the user.

Step S144: Receive a confirmation instruction of the user that is sent by the client, and use payment object information pointed to by the confirmation instruction, as the determined payment object information.

In this embodiment, the object information set stored in the server is queried according to the payment object description information, to further determine the payment object information. When multiple pieces of payment object information are obtained by querying, the multiple pieces of payment object information may be sent to the client and fed back to the user, to be specified by the user.

In this embodiment, the user may operate the client to send a confirmation instruction to the server. The confirmation instruction may be an electrical signal, and is used to indicate that the user selects a piece of payment object information. Specifically, a manner in which the user operates the client to send the confirmation instruction may include: recording audio information in a voice indicating that the user expresses a desire to select a piece of payment object information, and sending the audio information to the server. Alternatively, in a scenario in which the client includes a display, the user selects a piece of payment object information by operating a button or touching a screen, and the client sends, to the server, a message indicating the payment object information.

Figure 31:
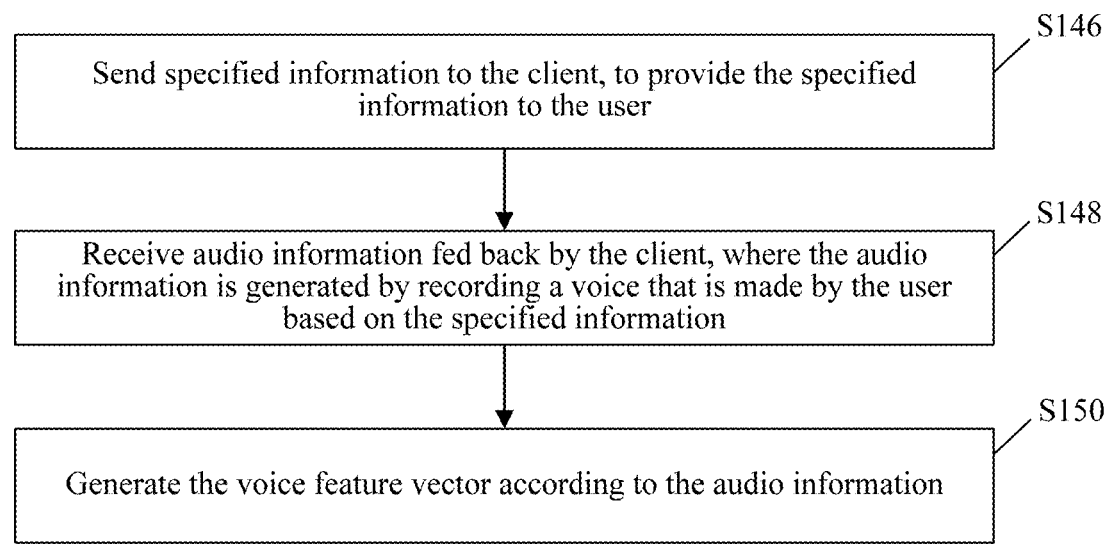
FIG. 31 is a schematic flowchart of a payment method according to an embodiment of this application.

Referring to FIG. 31, in an embodiment, the step of generating a voice feature vector may include the following steps.

Step S146: Send specified information to the client, to provide the specified information to the user.

In this embodiment, the specified information may instruct the user to read a text or answer a question. Specifically, for example, a segment of digits may be generated based on a random algorithm or the like, and is provided to the user by playing the segment of digits or displaying the segment of digits on a screen. Alternatively, a question with an answer preset by the user is selected and asked to the user.

Step S148: Receive audio information fed back by the client, where the audio information is generated by recording a voice that is made by the user based on the specified information.

Step S150: Generate the voice feature vector according to the audio information;

In this embodiment, that the user makes a voice according to the specified information may be that the user reads the text or answers the question according to content in the specified information. The user voice is recorded into audio information. In this way, a voice feature vector can be generated, to authenticate the identity of the user.

In this embodiment, the user voice may be constrained by using the specified information, thereby achieving a particular regulation function for the generated voice feature vector. In this way, it helps improve accuracy of determining whether the voice feature vector matches the user feature vector, that is, improve accuracy of authenticating the identity of the user.

Figure 32:
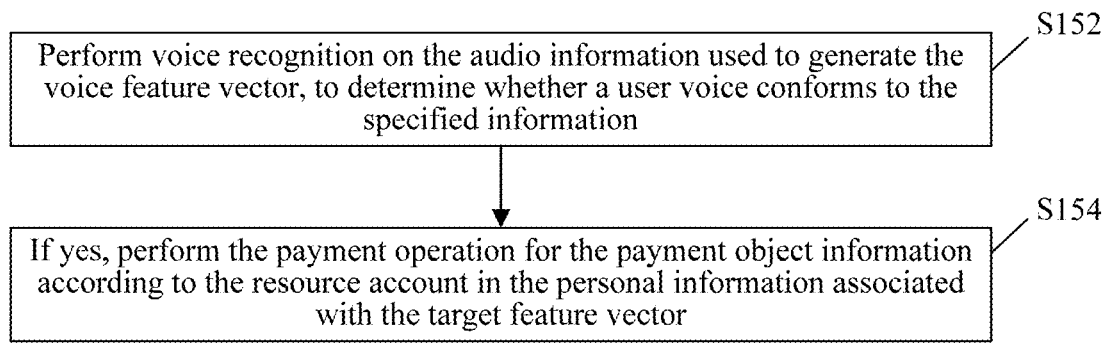
FIG. 32 is a schematic flowchart of a payment method according to an embodiment of this application.

Referring to FIG. 32, in an embodiment, the specified information is requesting the user to make a specified sound. Specifically, for example, the specified information is requesting the user to read a text or answer a question. The specified sound may be a voice of reading the text, or content in the answer. The step of performing a payment operation may further include the following steps:

Step S152: Perform voice recognition on the audio information used to generate the voice feature vector, to determine whether a user voice conforms to the specified information.

Step S154: If yes, perform the payment operation for the payment object information according to the resource account in the personal information associated with the target feature vector.

In this embodiment, two-factor authentication is used before a virtual resource of the user is transferred to a resource account corresponding to the payment object information. The voice feature vector is used to authenticate the identity of the user, to prevent a masquerade. Whether content in the audio information conforms to the content in the specified information is identified, to determine whether the user has an actual intention to pay a virtual resource. When the foregoing two-factor authentication succeeds, the personal information and the payment object information are sent to the server. In this way, security of the resource account of the user is greatly improved.

In this embodiment, that the user voice conforms to the specified information may be that, the content identified from the audio information is consistent with the text in the specified information that is provided to the user to read; or the content identified from the audio information is a correct answer to the question in the specified information that is provided to the user. Specifically, for example, the specified information is requesting the user to read "847579", and content obtained by identifying the audio information of the user is also "847579", so that it is considered that the user voice conforms to the specified information.

Figure 33:
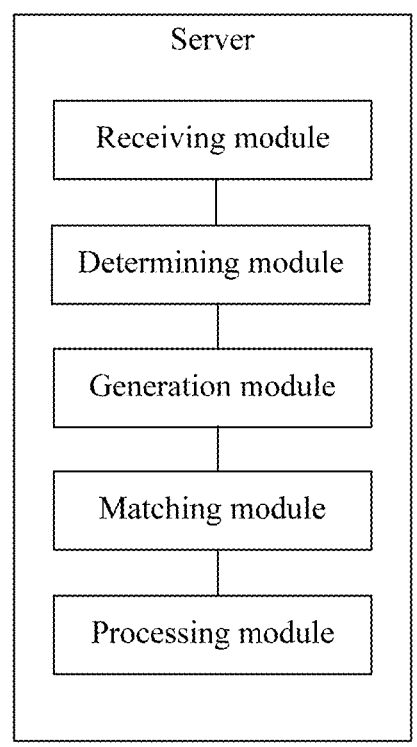
FIG. 33 is a schematic diagram of modules of a server according to an embodiment of this application.

Referring to FIG. 33, an embodiment of this application further provides a server. The server may include the following modules:

a receiving module, configured to receive audio information sent by a client, where the audio information is generated according to a voice input of a user;

a determining module, configured to determine payment object information according to the audio information;

a generation module, configured to generate a voice feature vector according to the audio information;

a matching module, configured to perform matching between the voice feature vector and a user feature vector in the server, where a user feature vector that successfully matches the voice feature vector is a target user feature vector; and a processing module, configured to perform a payment operation for the payment object information according to a resource account in personal information associated with the target feature vector.

For a function and an effect that are achieved by the server provided in this embodiment, refer to another embodiment for comparison and explanation.

Figure 34:
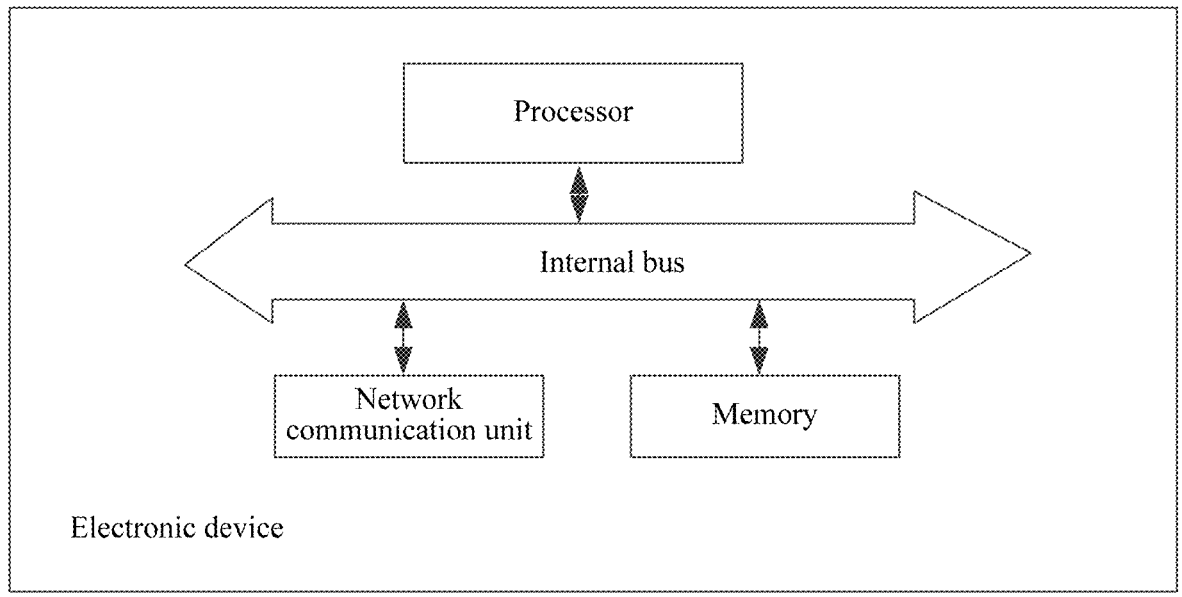
FIG. 34 is a schematic architectural diagram of an electronic device according to an embodiment of this application.

Referring to FIG. 34, an embodiment of this application further provides an electronic device, including a network communication unit, a memory, and a processor.

The network communication unit is configured to receive audio information provided by a client, where the audio information is generated according to a voice input of a user.

The memory is configured to store a user feature vector, where the user feature vector is associated with personal information.

The processor is configured to: determine payment object information according to the audio information, and generate a voice feature vector according to the audio information; perform matching between the voice feature vector and the user feature vector in the memory, where a user feature vector that successfully matches the voice feature vector is a target user feature vector; and perform a payment operation for the payment object information according to a resource account in personal information associated with the target feature vector.

In this embodiment, the memory includes, but is not limited to, a RAM, a ROM, a cache, an HDD, or a memory card. The memory may be configured to store computer program instructions. The network communication unit may be an interface that is set according to a standard specified in a communication protocol, and is configured to perform connection and communication by using a network.

In this embodiment, the processor may be implemented in any proper manner. For example, the processor may use a form such as a microprocessor or a processor and a computer readable medium storing computer readable program code (such as software or firmware) that can be executed by the (micro) processor, a logic gate, a switch, an ASIC, a programmable logic controller, or an embedded microcontroller.

For a function and an effect that are achieved by the electronic device provided in this embodiment, refer to another embodiment for comparison and explanation.

An embodiment of this application further provides a computer storage medium. The computer storage medium stores computer program instruction, and when the computer program instructions are executed by a processor, the following operations are performed: receiving audio information provided by a client, where the audio information is generated according to a voice input of a user; determining payment object information according to the audio information, and generating a voice feature vector according to the audio information; performing matching between the voice feature vector and a user feature vector in a server, where a user feature vector that successfully matches the voice feature vector is a target user feature vector; and performing a payment operation for the payment object information according to a resource account in personal information associated with the target feature vector.

In this embodiment, the computer storage medium includes, but is not limited to, a RAM, a ROM, a cache, an HDD, or a memory card.

For a function and an effect that are achieved when the program instructions in the computer storage medium provided in this embodiment are executed, refer to another embodiment for comparison and explanation.

Figure 35:
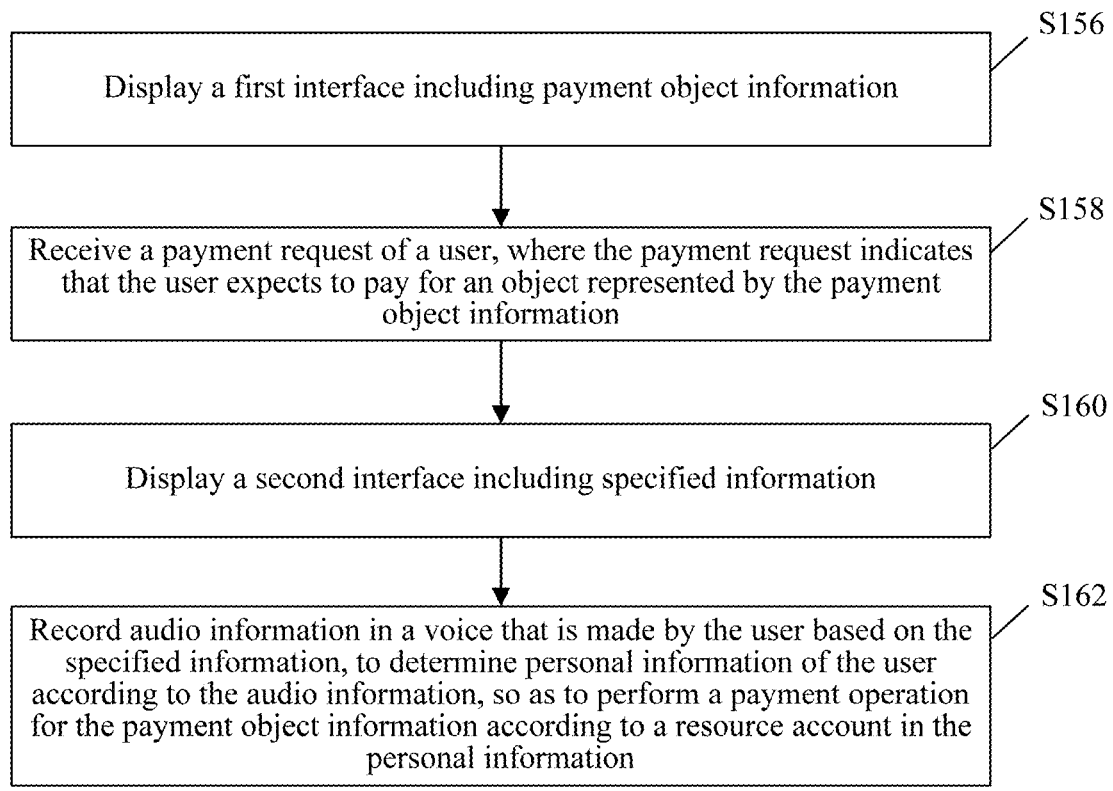
FIG. 35 is a schematic flowchart of a payment method according to an embodiment of this application.

Referring to FIG. 35, an embodiment of this application further provides a payment method. The method may include the following steps.

Step S156: Display a first interface including payment object information.

Figure 36:
FIG. 36 is a schematic diagram of a first interface displayed by a client according to an embodiment of this application.

In this embodiment, a client displays the first interface, as shown in FIG. 36, to provide content of the payment object information to a user. In this way, the user can know information in a relatively intuitive manner.

Step S158: Receive a payment request of a user, where the payment request indicates that the user expects to pay for an object represented by the payment object information.

In this embodiment, the user may operate the client by tapping a button "Pay now", to further pay for a product or a service indicated by the payment object information.

Step S160: Display a second interface including specified information.

Figure 37:
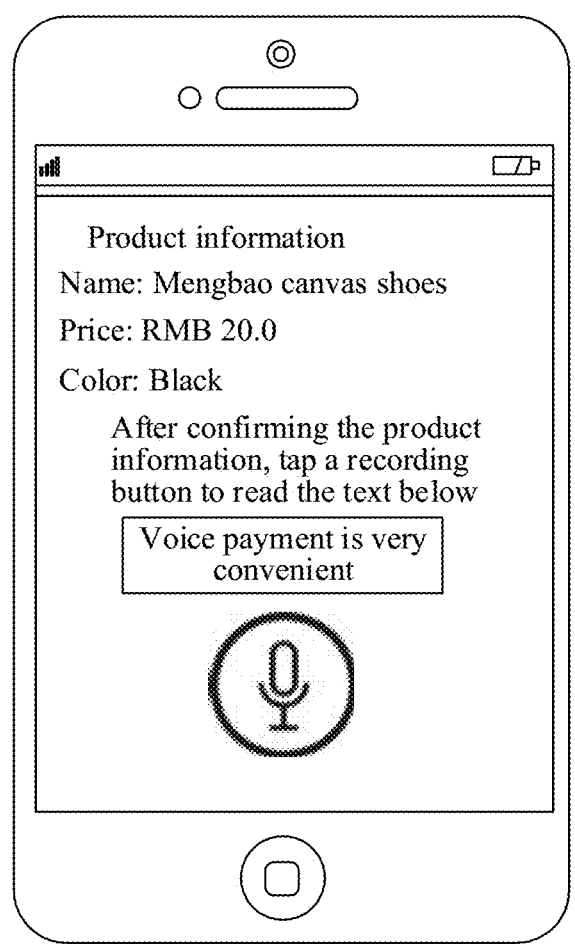
FIG. 37 is a schematic diagram of a second interface displayed by a client according to an embodiment of this application.

In this embodiment, as shown in FIG. 37, the second interface may be an interface used by the user to confirm payment. The interface includes specified information, to instruct the user to read a text or answer a question. Specifically, for example, the specified information is requesting the user to read "736452".

Step S162: Generate audio information according to a voice input that is made by the user based on the specified information, to determine personal information of the user according to the audio information, so as to perform a payment operation for the payment object information according to a resource account in the personal information.

In this embodiment, the user may tap a recording button in the second interface, to record a voice made by the user, to generate audio information. The client may generate a voice feature vector according to the audio information, and perform matching with a user feature vector in the client, to authenticate an identity of the user. Alternatively, the audio information may be sent to a server, and the server generates a voice feature vector and performs matching with a user feature vector, to obtain a target feature vector. A payment process can be performed after the personal information of the user is determined. That is, the user pays a required amount of money to a merchant selling the product or the service.

In this embodiment, the electronic device may use a device of any one of the category 2 to the category 5 in Table 1.

Figure 44:
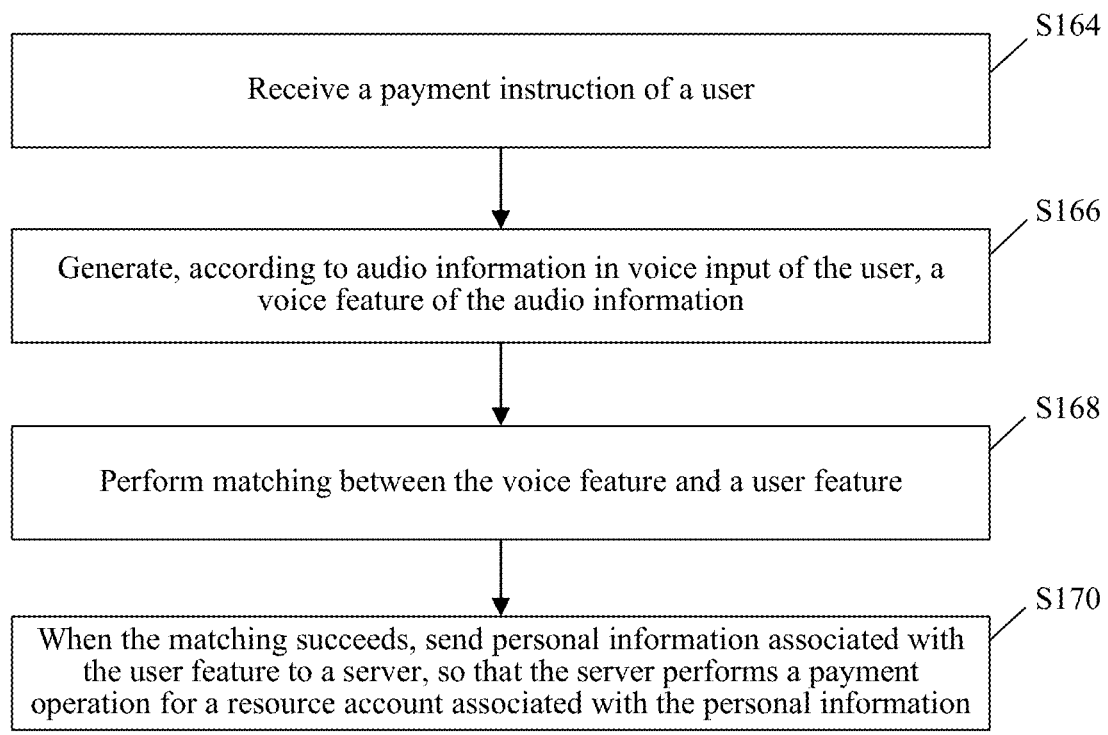
FIG. 44 is a schematic flowchart of a payment method according to an embodiment of this application.

Referring to FIG. 44, an embodiment of this application provides a payment method. The method may include the following steps.

Step S164: Receive a payment instruction of a user.

Step S166: Generate, according to audio information in a voice input of the user, a voice feature of the audio information.

In this embodiment, the voice feature that can represent the audio information may be generated according to the audio information. In a preferred embodiment, the voice feature may be represented by the voice feature vector. Certainly, in this embodiment, thee voice feature is not limited to a manner of the voice feature vector. Inspired by the technical essence of this application, a person skilled in the art may further make other changes, and the changes shall all fall with the protection scope of this application as long as functions and effects that are achieved by the changes are the same as or similar to those of this application.

Step S168: Perform matching between the voice feature and a user feature.

Step S170: When the matching succeeds, send personal information associated with the user feature to a server, so that the server performs a payment operation for a resource account associated with the personal information.

In this embodiment, matching is performed between the voice feature and the user feature, to authenticate an identity of the user. The identity may be authenticated by merely speaking by the user.

In this embodiment, the user feature may be registered in the client in advance. In this way, matching is performed between the voice feature of the current user and the user feature, to authenticate the identity of the user. That the voice feature matches the user feature may be that the voice feature and the user feature are used as input in calculation, and an output result satisfies a specified requirement.

In an embodiment, the step of generating a voice feature includes at least one of the following: selecting any piece of audio information of the user, to generate the voice feature; or obtaining audio information that is in the voice input of the user and that includes a user-defined payment keyword, and generating the voice feature according to the audio information; or providing specified information to the user, generating audio information according to a voice input that is made by the user based on the specified information, and generating the voice feature according to the audio information.

In an embodiment, the specified information is requesting the user to make a specified sound; and the step of sending personal information associated with the user feature to a server further includes: performing voice recognition on the audio information used to generate the voice feature, to determine whether a user voice conforms to the specified information; and if yes, sending the payment object information and the personal information associated with the user feature vector to the server.

The embodiments in this specification are all described in a progressive manner, for same or similar parts in the embodiments, refer to these embodiments, and each embodiment focuses on a difference from other embodiments.

In the 1990s, whether a technical improvement is a hardware improvement (for example, an improvement to a circuit structure such as a diode, a transistor, or a switch) or a software improvement (an improvement to a method procedure) can be distinguished very clearly. However, with the development of technologies, improvements to many current method procedures can already be considered as direct improvements to hardware circuit structures. In most cases, a designer programs an improved method procedure into a hardware circuit to obtain a corresponding hardware circuit structure. Therefore, it cannot be said that an improvement to a method procedure cannot be embodied by using a hardware entity module. For example, a programmable logic device (PLD) (such as a field programmable gate array (FPGA)) is such an integrated circuit, and a logic function thereof is determined by programming a device by a user. A designer voluntarily performs programming to "integrate" a digital system in a PLD, without requesting a chip manufacturer to design and manufacture a dedicated integrated circuit chip 2. In addition, at present, in replacement of manually manufacturing an integrated circuit chip, in most cases, such programming is implemented by using a "logic compiler", which is similar to a software compiler used during program development and writing, and to compile previous original code, a particular programming language needs to be used. The language is referred to as a hardware description language (HDL). There is not only one type of HDL, that is, there are multiple types of HDL, for example, the Advanced Boolean Expression Language (ABEL), the Altera Hardware Description Language (AHDL), the Confluence, the Cornell University Programming Language (CUPL), the HDCal, the Java Hardware Description Language (JHDL), the Lava, the Lola, the MyHDL, the PALASM, or the Ruby Hardware Description Language (RHDL). Currently, the Very-High-Speed Integrated Circuit Hardware Description Language (VHDL) and the Verilog2 are most commonly used. A person skilled in the art should also know that a hardware circuit for implementing a logic method procedure can be very easily obtained, as long as logic programming is slightly performed on the method procedure by using the foregoing several HDLs and the method procedure is programmed into an integrated circuit.

A person skilled in the art should also know that, in addition to implementing a controller by using only computer readable program code, logic programming can be absolutely performed on method steps to make the controller achieve a same function in a form of a logic gate, a switch, a dedicated integrated circuit, a programmable logic controller, an embedded microcontroller, or the like. Therefore, the controller may be considered as a hardware component, and apparatuses included in the controller and configured to achieve various functions may also be considered as structures in the hardware component. Alternatively, even, apparatuses configured to achieve various functions may be both considered as software modules for implementing a method and structures in a hardware component.

Through the foregoing descriptions of the embodiments, a person skilled in the art may clearly understand that this application may be implemented by software in addition to a necessary universal hardware platform. Based on such an understanding, the technical solutions of this application essentially or the part contributing to the prior art may be implemented in a form of a software product. The computer software product is stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of this application.

Although this application is described by using the embodiments, a person of ordinary skill in the art knows that, many variations and changes may be made to this application without departing from the spirit of this application, and the appended claims are intended to cover these variations and changes without departing from the spirit of this application.

What is claimed is:

1. A payment method, wherein the method comprises:
receiving a spoken payment instruction of a user via a user interface of an application;
obtaining payment object information based on the spoken payment instruction by:
performing voice recognition on the spoken payment instruction to obtain payment object description information,
querying an object information database according to the payment object description information to obtain the payment object information; and
determining whether a payment amount in the payment object information is greater than a threshold amount;
if the payment amount is greater than the threshold amount, providing specified information to the user via the user interface of the application requesting the user to speak a user-defined payment keyword previously defined by the user during a registration process;
receiving a voice input from the user in response to the specified information, the voice input comprising the user-defined payment keyword;
generating audio information according to (i) the spoken payment instruction and (ii) the voice input that is made by the user based on the specified information;
generating, according to the audio information, a feature matrix comprising at least one feature of audio data in the audio information, the at least one feature of the audio data comprising at least one of frequency data or amplitude data;
performing dimension reduction processing on the feature matrix by:
inputting the feature matrix and multiple feature dimensions for a voice feature vector of the audio information into a neural network, and
obtaining, from the neural network, multiple dimension values representing the multiple feature dimensions based on the feature matrix;

generating the voice feature vector of the audio information by arranging the multiple dimension values according to a specified order;
authenticating an identity of the user by:
performing matching between the voice feature vector and a user feature vector, and
determining whether the user-defined payment keyword in the voice input of the user is the same as a preset keyword;
when the authenticating succeeds based on a successful matching of the voice feature vector and the user feature vector and the user-defined payment keyword in the voice input of the user is the same as the preset keyword, sending the payment object information and personal information associated with the user feature vector to a server that performs a payment operation for the payment object information according to a resource account associated with the personal information.

2. The method according to claim 1, wherein before the receiving the spoken payment instruction of the user, the method further comprises: obtaining an enabling instruction from the audio information in the voice input of the user.

3. The method according to claim 1, wherein the step of generating the voice feature vector comprises at least one of the following:
selecting any piece of audio information of the user, to generate the voice feature vector.

4. The method according to claim 3, wherein the sending further comprises:
performing voice recognition on the audio information used to generate the voice feature vector;
determining whether a user voice conforms to the specified information; and
in response to determining that the user voice conforms to the specified information, sending the payment object information and the personal information associated with the user feature vector to the server.

5. The payment method of claim 1, wherein the providing specified information to the user via the user interface of the application requesting the user to speak the user-defined payment keyword comprises:
displaying a question on the user interface of the application requesting the user to use voice to provide a corresponding answer, the question and the corresponding answer being preset by the user during the registration process.

6. The payment method of claim 1, further comprising:
generating a segment of digits using a random algorithm;
displaying the segment of digits on the user interface requesting the user to use voice to read the segment of digits; and
receiving the voice input comprising a user's voice reading the segment of digits.

7. The payment method of claim 1, further comprising determining the user feature vector of the user, wherein the determining the user feature vector of the user comprises:
acquiring one or more pieces of audio information from the user;
generating a plurality of voice feature vectors based on the one or more pieces of audio information from the user; and
selecting one of the plurality of voice feature vectors including a largest quantity of voice features as the user feature vector of the user.

8. A non-transitory computer-readable medium, storing program instructions, wherein when the program instructions are executed by a processor, the following operations are performed:
receiving a spoken payment instruction of a user via a user interface of an application;
obtaining payment object information based on the spoken payment instruction by:
performing voice recognition on the spoken payment instruction to obtain payment object description information,
querying an object information database according to the payment object description information to obtain the payment object information; and
determining whether a payment amount in the payment object information is greater than a threshold amount;
if the payment amount is greater than the threshold amount, providing specified information to the user via the user interface of the application requesting the user to speak a user-defined payment keyword previously defined by the user during a registration process;
receiving a voice input from the user in response to the specified information, the voice input comprising the user-defined payment keyword;
generating audio information according to (i) the spoken payment instruction and (ii) the voice input that is made by the user based on the specified information;
generating, according to the audio information, a feature matrix comprising at least one feature of audio data in the audio information, the at least one feature of the audio data comprising at least one of frequency data or amplitude data;
performing dimension reduction processing on the feature matrix to obtain multiple dimension values representing the multiple feature dimensions based on the feature matrix;
generating a voice feature vector of the audio information by arranging the multiple dimension values according to a specified order;
authenticating an identity of the user by:
performing matching between the voice feature vector and a user feature vector, and
determining whether the user-defined payment keyword in the voice input of the user is the same as a preset keyword;
when the authenticating succeeds based on a successful matching of the voice feature vector and the user feature vector and the user-defined payment keyword in the voice input of the user is the same as the preset keyword, sending the payment object information and personal information associated with the user feature vector to a server that performs a payment operation for the payment object information according to a resource account associated with the personal information.

9. The non-transitory computer-readable medium according to claim 8, wherein before receiving the spoken payment instruction of the user, the operations further comprise: obtaining an enabling instruction from the audio information in the voice input of the user.

10. The non-transitory computer-readable medium according to claim 8, wherein generating a voice feature vector comprises at least one of the following:
selecting any piece of audio information of the user, to generate the voice feature vector.

11. The non-transitory computer-readable medium according to claim 10, wherein sending further comprises:

performing voice recognition on the audio information used to generate the voice feature vector;

determining whether a user voice conforms to the specified information; and in response to determining that the user voice conforms to the specified information, sending the payment object information and at least one of the audio information, the feature matrix, or the voice feature vector to the server.

12. The non-transitory computer-readable medium of claim 8, wherein the providing specified information to the user via the user interface of the application requesting the user to speak the user-defined payment keyword comprises:

displaying a question on the user interface of the application requesting the user to use voice to provide a corresponding answer, the question and the corresponding answer being preset by the user during the registration process.

13. The non-transitory computer-readable medium of claim 8, wherein the operations further comprise:

generating a segment of digits using a random algorithm;

displaying the segment of digits on the user interface requesting the user to use voice to read the segment of digits; and receiving the voice input comprising a user's voice reading the segment of digits.

14. A system, comprising:

a hardware processor; and a non-transitory machine-readable storage medium encoded with instructions executable by the hardware processor to perform an operations comprising:

receiving a spoken payment instruction of a user via a user interface of an application;

obtaining payment object information based on the spoken payment instruction by:

performing voice recognition on the spoken payment instruction to obtain payment object description information, querying an object information database according to the payment object description information to obtain the payment object information; and determining whether a payment amount in the payment object information is greater than a threshold amount;

if the payment amount is greater than the threshold amount, providing specified information to the user via the user interface of the application requesting the user to speak a user-defined payment keyword previously defined by the user during a registration process;

receiving a voice input from the user in response to the specified information, the voice input comprising the user-defined payment keyword;

generating audio information according to (i) the spoken payment instruction and (ii) the voice input that is made by the user based on the specified information;

generating, according to the audio information, a feature matrix comprising at least one feature of audio data in the audio information, the at least one feature of the audio data comprising at least one of frequency data or amplitude data;

performing dimension reduction processing on the feature matrix to obtain multiple dimension values representing the multiple feature dimensions based on the feature matrix;

generating a voice feature vector of the audio information by arranging the multiple dimension values according to a specified order;

authenticating an identity of the user by:

performing matching between the voice feature vector and a user feature vector, and determining whether the user-defined payment keyword in the voice input of the user is the same as a preset keyword;

when the authenticating succeeds based on a successful matching of the voice feature vector and the user feature vector and the user-defined payment keyword in the voice input of the user is the same as the preset keyword, sending the payment object information and personal information associated with the user feature vector to a server that performs a payment operation for the payment object information according to a resource account associated with the personal information.

15. The system according to claim 14, wherein before receiving the spoken payment instruction of the user, the operations further comprise: obtaining an enabling instruction from the audio information in the voice input of the user.

16. The system according to claim 14, wherein generating the voice feature vector comprises at least one of the following:

selecting any piece of audio information of the user, to generate the voice feature vector.

17. The system according to claim 16, wherein the sending further comprises:

performing voice recognition on the audio information used to generate the voice feature vector;

determining whether a user voice conforms to the specified information; and in response to determining that the user voice conforms to the specified information, sending the payment object information and at least one of the audio information, the feature matrix, or the voice feature vector to the server.

18. The system of claim 14, wherein the providing specified information to the user via the user interface of the application requesting the user to speak the user-defined payment keyword comprises:

displaying a question on the user interface of the application requesting the user to use voice to provide a corresponding answer, the question and the corresponding answer being preset by the user during the registration process.

19. The system of claim 14, wherein the operations further comprise:

generating a segment of digits using a random algorithm;

displaying the segment of digits on the user interface requesting the user to use voice to read the segment of digits; and receiving the voice input comprising a user's voice reading the segment of digits.

* * * * *